United States Patent
Mori et al.

(10) Patent No.: US 10,658,672 B2
(45) Date of Patent: May 19, 2020

(54) ALL-SOLID-STATE BATTERY AND MANUFACTURING METHOD

(71) Applicant: Panasonic Intellectual Property Management Co., Ltd., Osaka (JP)

(72) Inventors: Masahiro Mori, Osaka (JP); Mituhiro Yosinaga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 54 days.

(21) Appl. No.: 15/877,519

(22) Filed: Jan. 23, 2018

(65) Prior Publication Data

US 2018/0226652 A1   Aug. 9, 2018

(30) Foreign Application Priority Data

Feb. 9, 2017  (JP) .................................. 2017-022282

(51) Int. Cl.
  *H01M 4/66* (2006.01)
  *H01M 4/1391* (2010.01)
  (Continued)

(52) U.S. Cl.
  CPC ........... *H01M 4/661* (2013.01); *H01M 4/043* (2013.01); *H01M 4/0471* (2013.01);
  (Continued)

(58) Field of Classification Search
  CPC ........... H01M 10/0562; H01M 10/052; H01M 10/0525; H01M 10/0585;
  (Continued)

(56) References Cited

U.S. PATENT DOCUMENTS

2007/0178675 A1   8/2007 Straboni
2009/0098281 A1   4/2009 Zhang et al.
(Continued)

FOREIGN PATENT DOCUMENTS

JP   2006-523021   10/2006
JP   2009-524900    7/2009
(Continued)

OTHER PUBLICATIONS

The Extended European Search Report dated May 30, 2018 for the related European Patent Application No. 17209912.9.
Dr Arnold Gillner: "Laser Structuring and Laser Cutting of Solid-State Batteries", Sep. 10, 2017 (Sep. 10, 2017), pp. 1-1, XP055471582, Retrieved from the Internet: URL:https://web.archive.org/web/20170910052650/http://www.ilt.fraunhofer.de/content/dam/ilt/en/documents/annual_reports/ar15/TF2/AR15_S91.pdf [retrieved on Apr. 30, 2018].

* cited by examiner

*Primary Examiner* — Carlos Barcena
(74) *Attorney, Agent, or Firm* — Pearne & Gordon LLP

(57) ABSTRACT

An all-solid-state battery includes a positive-electrode current collector, a positive electrode layer, a negative-electrode current collector, a negative electrode layer, and a solid electrolyte layer. The positive electrode layer is formed on the positive-electrode current collector and includes at least a positive-electrode active material. The negative electrode layer is formed on the negative-electrode current collector and includes at least a negative-electrode active material. The solid electrolyte layer is disposed between the positive electrode layer and the negative electrode layer and includes at least a solid electrolyte having ion conductivity. At least one member selected from the group consisting of the positive-electrode current collector, the positive electrode layer, the negative-electrode current collector, the negative electrode layer, and the solid electrolyte layer includes a heated region at an end portion of the at least one member.

8 Claims, 10 Drawing Sheets

(51) Int. Cl.
  *H01M 4/02* (2006.01)
  *H01M 10/052* (2010.01)
  *H01M 10/0562* (2010.01)
  *H01M 10/0525* (2010.01)
  *H01M 10/0585* (2010.01)
  *H01M 4/04* (2006.01)

(52) U.S. Cl.
  CPC ........... *H01M 4/663* (2013.01); *H01M 4/668* (2013.01); *H01M 10/052* (2013.01); *H01M 10/0525* (2013.01); *H01M 10/0562* (2013.01); *H01M 10/0585* (2013.01); *H01M 4/0404* (2013.01); *H01M 4/1391* (2013.01); *H01M 2004/027* (2013.01); *H01M 2004/028* (2013.01); *H01M 2220/20* (2013.01); *H01M 2300/0068* (2013.01); *Y02E 60/122* (2013.01)

(58) Field of Classification Search
  CPC ..... H01M 2004/027; H01M 2004/028; H01M 2220/20; H01M 2300/0068; H01M 4/0404; H01M 4/043; H01M 4/0471; H01M 4/1391; H01M 4/661; H01M 4/663; H01M 4/668
  See application file for complete search history.

(56) References Cited

U.S. PATENT DOCUMENTS

| | | |
|---|---|---|
| 2010/0104951 A1 | 4/2010 | Iwama et al. |
| 2012/0225351 A1 | 9/2012 | Kojima |
| 2014/0162113 A1* | 6/2014 | Ohta .................. H01B 1/08 429/162 |
| 2015/0349373 A1* | 12/2015 | Snyder ................ H01M 10/02 429/162 |
| 2016/0190592 A1 | 6/2016 | Ochiai et al. |

FOREIGN PATENT DOCUMENTS

| | | |
|---|---|---|
| JP | 2010-103006 | 5/2010 |
| JP | 5747506 B | 7/2015 |
| JP | 2016-127015 | 7/2016 |
| JP | 2016-219348 A | 12/2016 |

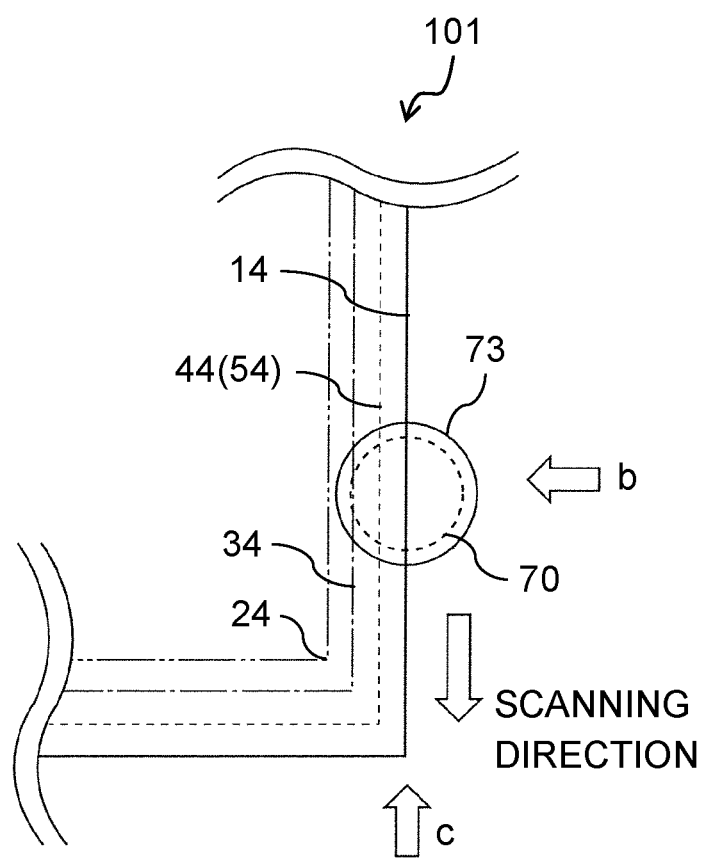

SCANNING
DIRECTION

ALL-SOLID-STATE BATTERY AND MANUFACTURING METHOD

BACKGROUND

1. Technical Field

The disclosure relates to an all-solid-state battery, and particularly to an all-solid-state battery using a positive electrode layer, a negative electrode layer, and a solid electrolyte layer.

2. Description of the Related Art

Recently, development of a secondary battery which can be used repeatedly is required with reduction in weight of electronic equipment such as a personal computer or a portable phone and manufacturing of cordless electronic equipment. As the secondary battery, a Ni—Cd battery, a Ni-MH battery, a lead storage battery, a Li-ion battery, and the like are provided. The Li-ion battery concentrates attentions because of characteristics of a light weight, a high voltage, and high energy density.

In the field of automobiles such as an electric automobile or a hybrid car, development of a secondary battery having high capacity becomes important and demand of a Li-ion battery tends to increase.

The Li-ion battery includes a positive electrode layer, a negative electrode layer, and an electrolyte disposed between the positive electrode layer and the negative electrode layer. As the electrolyte, an electrolytic solution or a solid electrolyte in which a supporting salt, for example, lithium hexafluorophosphate is dissolved in an organic solvent is used. A Li-ion battery which is currently used widely has flammability because an electrolytic solution including an organic solvent is used. Therefore, a material, a structure, and a system for securing safety are required. Regarding this, it is expected that it is possible to simplify the material, the structure, and the system by using a nonflammable solid electrolyte as the electrolyte, and it is considered that it is possible to increase energy density, reduce manufacturing cost, and to improve productivity. It is assumed below that a battery using a solid electrolyte is referred to as an "all-solid-state battery".

The all-solid-state battery is configured by stacking an electrode (positive-electrode current collector) which is used for positive electrode current collection and is formed by a metal foil, a positive electrode layer, a solid electrolyte layer, a negative electrode layer, and an electrode (negative-electrode current collector) which is used for negative electrode current collection and is formed by a metal foil, in this order.

The solid electrolyte constituting the solid electrolyte layer can be roughly classified into an organic solid electrolyte and an inorganic solid electrolyte. The organic solid electrolyte has ion conductivity of about $10^{-6}$ S/cm at 25° C. and this value is much lower than $10^{-3}$ S/cm which is ion conductivity of the electrolytic solution. Therefore, it is difficult to operate an all-solid-state battery using an organic solid electrolyte, in an environment of 25° C. As the inorganic solid electrolyte, an oxide-based solid electrolyte and a sulfide-based solid electrolyte are provided. Ion conductivity of each of the solid electrolytes is $10^{-4}$ to $10^{-3}$ S/cm. The oxide-based solid electrolyte has large particle boundary resistance. As a method of decreasing the particle boundary resistance, sintering of powder or thinning is examined. However, in a case of sintering powder, a treatment is performed at a high temperature. Thus, a constituent element of a positive electrode layer or a negative electrode layer and a constituent element of a solid electrolyte are mutually diffused, and accordingly, it is difficult to obtain favorable charging-and-discharging characteristics. Therefore, regarding an all-solid-state battery using an oxide-based solid electrolyte, examination in a thin film is the mainstream. However, a thin-film type all-solid-state battery has difficulty in increasing the size of a battery and is unsuitable for increasing capacity to be high.

Since the sulfide-based solid electrolyte has particle boundary resistance smaller than that of the oxide-based solid electrolyte, the sulfide-based solid electrolyte has features in that favorable characteristics are obtained just by performing compression molding of powder without using a sintering process. Regarding development of an all-solid-state battery for a more increase of the size thereof and a more increase of the capacity thereof, research of a coating type all-solid-state battery which uses the sulfide-based solid electrolyte and can have an increased size has proceeded actively in recent years. A coating type all-solid-state battery includes a positive electrode layer, a negative electrode layer, and a solid electrolyte layer. The positive electrode layer is formed on a positive-electrode current collector formed by a metal foil and includes a positive-electrode active material, a solid electrolyte, and a binder. The negative electrode layer is formed on a negative-electrode current collector formed by a metal foil and includes a negative-electrode active material, a solid electrolyte, and a binder. The solid electrolyte layer is disposed between the positive electrode layer and the negative electrode layer, and includes a solid electrolyte and a binder. The binder included in the positive electrode layer or the negative electrode layer, and the binder included in the solid electrolyte are required for improving adhesion strength as follows: for example, adhesion strength between pieces of powder of an active material and another active material which are included in the positive electrode layer and the negative electrode layer; adhesion strength between pieces of powder of the active material and the solid electrolyte; adhesion strength between pieces of powder of the solid electrolyte and another solid electrolyte (adhesion strength between the solid electrolytes); adhesion strength between a coated film and the current collector; and adhesion strength between a solid electrolyte and another solid electrolyte included in the solid electrolyte layer (between the solid electrolytes). The binder functions as a factor of deteriorating characteristics of a battery because the ion conductivity of the binder is much lower than that of the solid electrolyte.

Japanese Patent No. 5747506 discloses a manufacturing method of improving adhesion strength between a positive-electrode coating film and a positive-electrode current collector in a positive electrode layer which does not include a binder.

SUMMARY

According to an aspect of the disclosure, an all-solid-state battery includes a positive-electrode current collector, a positive electrode layer, a negative-electrode current collector, a negative electrode layer, and a solid electrolyte layer. The positive-electrode current collector is formed by a metal foil. The positive electrode layer is formed on the positive-electrode current collector and includes at least a positive-electrode active material. The negative-electrode current collector is formed by a metal foil. The negative electrode layer is formed on the negative-electrode current collector and includes at least a negative-electrode active material.

The solid electrolyte layer is disposed between the positive electrode layer and the negative electrode layer, and includes a solid electrolyte having at least ion conductivity. At least one member selected from the group consisting of the positive-electrode current collector, the positive electrode layer, the solid electrolyte layer, the negative-electrode current collector, and the negative electrode layer has a heated region at least one end portion. In the heated region, an influence of heat is received or particles included in the at least one member is melted and then re-solidified. Here, the heated region includes a heat affected region in which an influence of heat is received, and a sintered region in which at least a portion of a material constituting the member is melted and then re-solidified.

According to another aspect of the disclosure, there is provided a manufacturing method of an all-solid-state battery which includes a positive-electrode current collector, a positive electrode layer which is formed on the positive-electrode current collector and includes at least a positive-electrode active material, a negative-electrode current collector, a negative electrode layer which is formed on the negative-electrode current collector and includes at least a negative-electrode active material, and a solid electrolyte layer which is disposed between the positive electrode layer and the negative electrode layer and includes a solid electrolyte having at least ion conductivity. The manufacturing method includes a preparation process and a laser cutting process. In the preparation process, at least one member selected from the group consisting of the positive-electrode current collector, the positive electrode layer, the solid electrolyte layer, the negative-electrode current collector, and the negative electrode layer which constitute an electrode group for the all-solid-state battery is prepared before laser cutting. In the laser cutting process, the at least one member is cut out by using laser such that the at least one member is formed so as to have a predetermined outer shape, and thus a heated region in which an influence of heat is received or particles included in the at least one member is melted and then re-solidified is formed at an end portion of the at least one member after being cut out.

With the disclosure, there are provided an all-solid-state battery and a manufacturing method thereof in which both high adhesion strength between members of the all-solid-state battery, and excellent battery characteristics, which have a trade-off relationship are achieved.

BRIEF DESCRIPTION OF THE DRAWINGS

FIG. 5A is a schematic top view illustrating a cutting method using laser for an electrode group for the all-solid-state battery in the exemplary embodiment;

DETAILED DESCRIPTION

Figure 1:
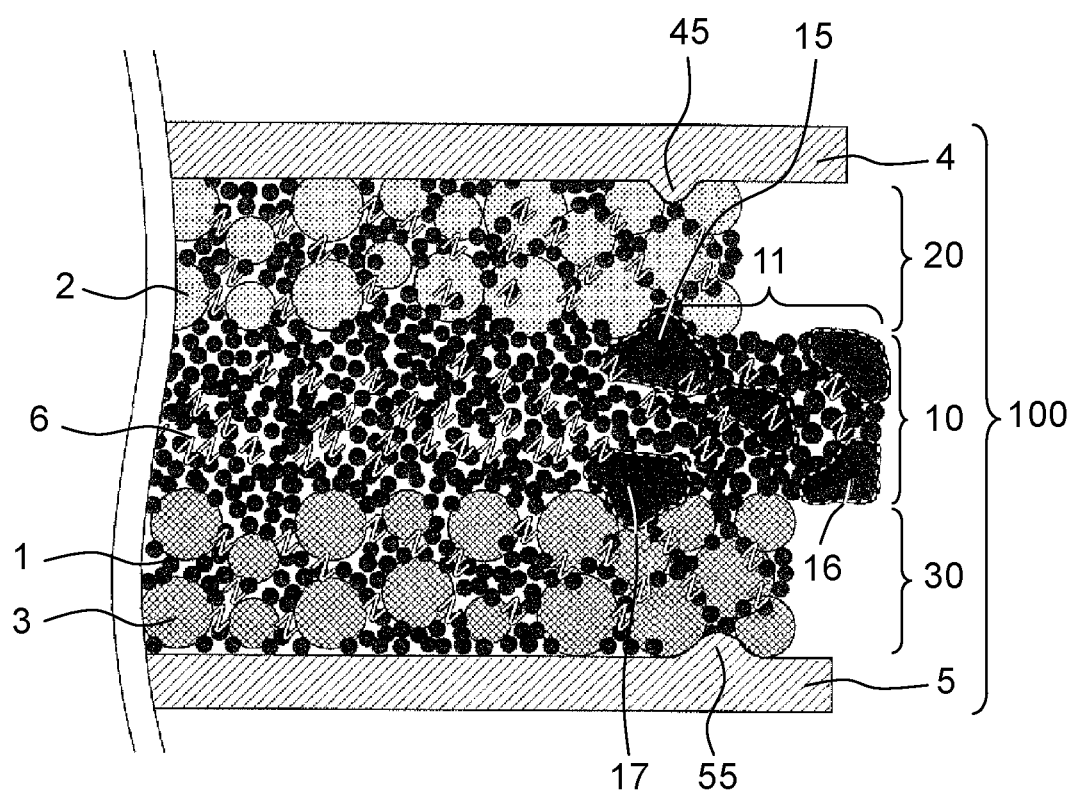
FIG. 1 is a schematic sectional view illustrating an all-solid-state battery according to an exemplary embodiment.

Ahead of descriptions of an exemplary embodiment, a problem in the related art will be briefly described.

The manufacturing method disclosed in Japanese Patent No. 5747506 has a problem as follows. That is, a binder which is a factor of deteriorating battery characteristics is not used, but heat for sintering is necessarily applied to the entirety of the electrode. Thus, constituent elements of the positive electrode layer or the negative electrode layer, and constituent elements of the solid electrolyte are mutually diffused. Accordingly, it is difficult to obtain favorable charging-and-discharging characteristics.

Considering the above problem, an object of the disclosure is to provide an all-solid-state battery and a manufacturing method thereof in which both high adhesion strength between members of the all-solid-state battery, and excellent battery characteristics which have a trade-off relationship are achieved.

Hereinafter, an all-solid-state battery, and a solid electrolyte layer, a positive electrode layer, and a negative electrode layer which constitute the all-solid-state battery in an exemplary embodiment of the disclosure will be described in detail. The exemplary embodiment which will be described below describes just a comprehensive or specific example.

Thus, numerical values, shapes, materials, constituent components, positions of the constituent components, a connection form thereof, in addition to processes, an order of the processes, and the like described in the following exemplary embodiment are just an example, and are not limited to the disclosure. Regarding a constituent component which is not described in the independent claim which describes the top concept of the disclosure, among the constituent components in the following exemplary embodiment, any constituent component will be described.

The drawings are schematic diagrams and are not necessarily and strictly illustrated. In the drawings, the substantially same components are denoted by the same reference signs, and repetitive descriptions may be omitted or simplified.

EXEMPLARY EMBODIMENT

Hereinafter, an all-solid-state battery and a manufacturing method of the all-solid-state battery according to an exemplary embodiment will be described with reference to FIGS. 1 to 8.

A. All-Solid-State Battery

Figure 2:
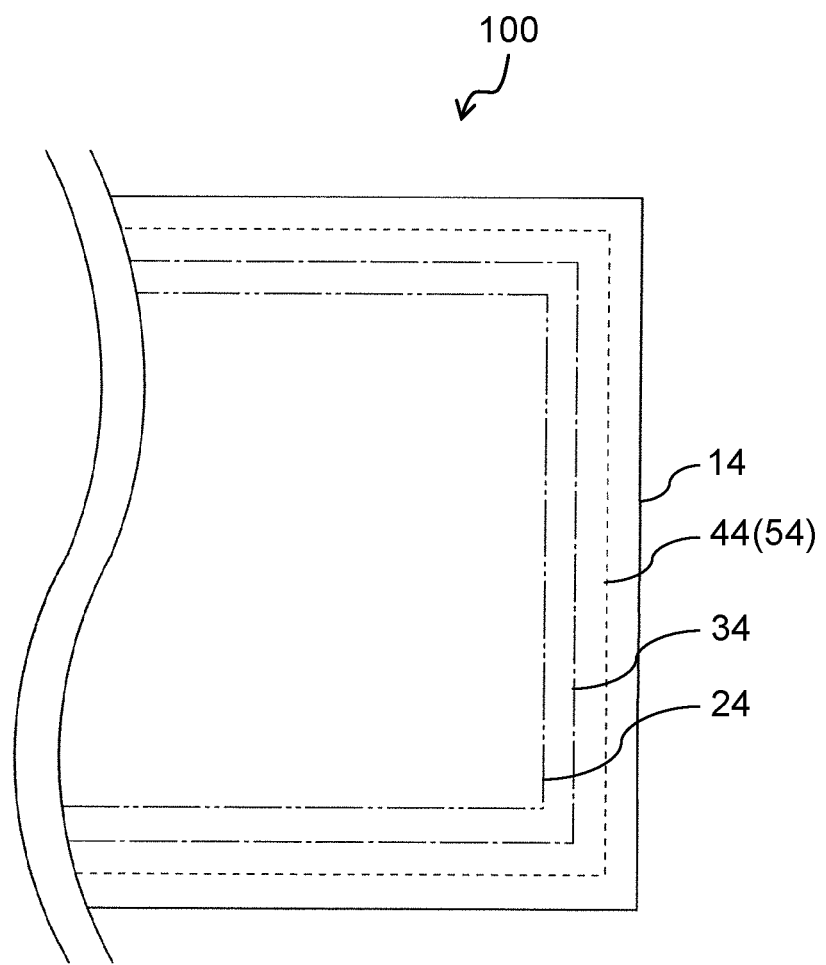
FIG. 2 is a schematic top view illustrating the all-solid-state battery according to the exemplary embodiment.
Figure 3:
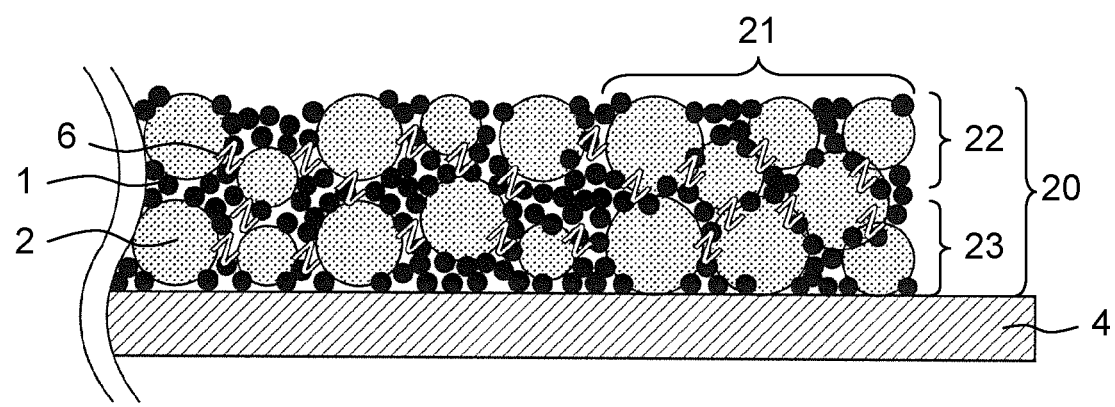
FIG. 3 is a schematic sectional view illustrating a positive electrode in the exemplary embodiment.
Figure 4:
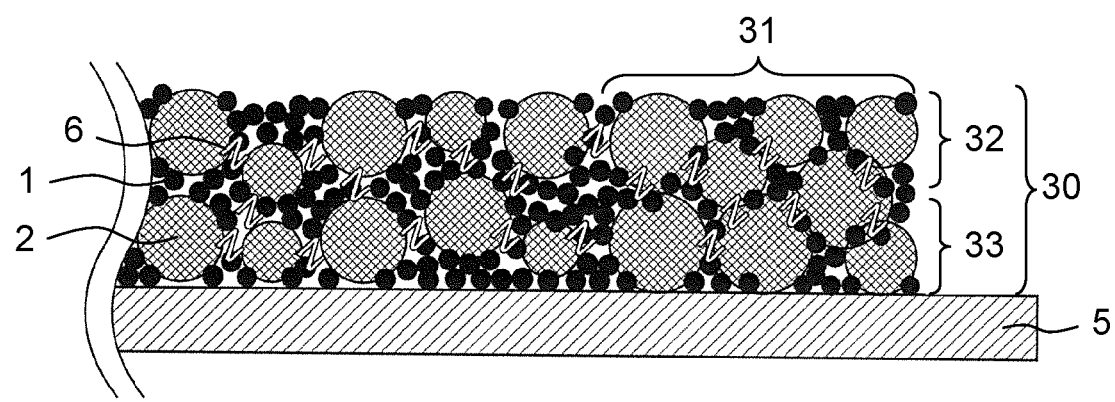
FIG. 4 is a schematic sectional view illustrating a negative electrode in the exemplary embodiment.

An all-solid-state battery according to the exemplary embodiment will be described with reference to FIGS. 1 to 4. FIG. 1 is a schematic sectional view illustrating the all-solid-state battery according to the exemplary embodiment. FIG. 2 is a schematic top view illustrating the all-solid-state battery according to the exemplary embodiment. FIG. 3 is a schematic sectional view illustrating a positive electrode in the exemplary embodiment. FIG. 4 is a schematic sectional view illustrating a negative electrode in the exemplary embodiment.

As illustrated in FIG. 1, all-solid-state battery 100 according to the exemplary embodiment includes positive-electrode current collector 4, positive electrode layer 20, negative-electrode current collector 5, negative electrode layer 30, and solid electrolyte layer 10. Positive electrode layer 20 is formed on positive-electrode current collector 4 and includes at least positive-electrode active material 2. Negative electrode layer 30 is formed on negative-electrode current collector 5 and includes at least negative-electrode active material 3. Solid electrolyte layer 10 is disposed between positive electrode layer 20 and negative electrode layer 30 and includes at least solid electrolyte 1 having ion conductivity. In all-solid-state battery 100, at least one member selected from the group consisting of positive-electrode current collector 4, positive electrode layer 20, solid electrolyte layer 10, negative-electrode current collector 5, and negative electrode layer 30 includes a heated region, at an end portion of the at least one member. In the heated region, influence of heat is received or particles included in the member are melted and then are re-solidified.

Here, the end portion refers to the entirety of an edge and an edge portion (circumferential portion) of each of the members in a case where all-solid-state battery 100 is viewed in plan view.

The heated region includes, for example, a region (heat affected region) in which the influence of heat by heating or the like is received, and a region (sintered region) in which at least a portion of the material constituting this member is melted by heating and then is re-solidified.

In the exemplary embodiment, the heated region may be formed in a vicinity region (may be simply referred to as a "vicinity region" below) which is expanded in a direction which is substantially perpendicular to the entirety of the edge and the edge portion of each of the members.

The heated region may be formed at a portion of the entirety (circumferential portion) of the edge of each of the members and in the vicinity region of the portion thereof. For example, in a case where the shape of each of the members in plan view is substantially rectangular, the heated region may be formed in four circumferences of the rectangular shape. In addition, the heated region may be formed at two edge portions which face each other in a longitudinal direction or a transverse direction, and in vicinity regions of the two edge portions. The width of the heated region in a direction perpendicular to the edge portion is appropriately selected in accordance with the real dimensions and the like of each of the members. From a viewpoint of suppressing deterioration of the battery characteristics, the width of the heated region is preferably equal to or smaller than 5 mm, and more preferably equal to or greater than the thickness of each of the members and equal to or smaller than 5 mm. The width of the heated region in the direction perpendicular to the edge portion may be changed for each edge portion. The phase of "being equal to or greater than the thickness of each of the members" means, for example, being equal to or greater than 100 μm in the positive electrode layer and the negative electrode layer and being equal to or greater than 10 μm in the solid electrolyte layer. The proportion between the heated region in each of the members and a general region (may be referred to as a "non-heated region" below) which does not have heat history is not particularly limited. For example, from a viewpoint of easiness and the like of manufacturing, the area of the non-heated region may be configured so as to be greater than the area of the heated region. The boundary between the heated region and the non-heated region in each of the members may have a straight line shape or a curved line shape, may be in a state where a straight line and a curved line are mixed, and further may have an unevenness. Such a heated region is configured, and thus it is possible to easily obtain the above-described effect of the disclosure.

In the heated region at the end portion of each of the members, for example, an influence of heat generated when cutting is performed by using laser light is received, and thus solid electrolyte 15, solid electrolyte 16, solid electrolyte 17, positive-electrode current collector 45 in which metal constituting positive-electrode current collector 4 is melted, in voids of adjacent positive electrode layer 20, and then is re-solidified, negative-electrode current collector 55 in which metal constituting negative-electrode current collector 5 is melted, in voids of adjacent negative electrode layer 30, and then is re-solidified, and the like are formed. Here, solid electrolyte 15 is a solid electrolyte in which solid electrolyte 1 included in solid electrolyte layer 10 and solid electrolyte 1 included in positive electrode layer 20 are integrated with each other. Solid electrolyte 16 is a solid electrolyte in which solid electrolyte 1 is aggregated. Solid electrolyte 17 is a solid electrolyte in which solid electrolyte 1 included in solid electrolyte layer 10 and solid electrolyte 1 included in negative electrode layer 30 are integrated with each other. This is similarly applied to the following descriptions.

In this manner, since the heated region is provided at the end portion of each of the members, metal constituting solid electrolyte 1, positive-electrode active material 2, negative-electrode active material 3, positive-electrode current collector 4, and negative-electrode current collector 5 in which the influence of heat is received is permeated into voids of solid electrolyte layer 10, positive electrode layer 20, and negative electrode layer 30 which are adjacent to each other, and then is solidified. Thus, it is possible to improve adhesiveness between the layers is the anchor effect, to prevent peeling-off between the layers or prevent loss of solid electrolyte 1, positive-electrode active material 2, or negative-electrode active material 3, and to secure long-term reliability of a battery.

In all-solid-state battery 100 according to the exemplary embodiment, a particle included in the heated region of at least one of positive electrode layer 20, solid electrolyte layer 10, and negative electrode layer 30 may be larger than a particle included in a region other than the heated region. As illustrated in FIGS. 1, 3, and 4, a heat affected region (heat affected region 11 of solid electrolyte layer 10, heat affected region 21 of positive electrode layer 20, and heat affected region 31 of negative electrode layer 30) as the heated region is formed at the end portion of each of the layers (which describe solid electrolyte layer 10, positive electrode layer 20, and negative electrode layer 30, the same below). In each of the heat affected regions 11, 21, and 31, regarding solid electrolyte 1, positive-electrode active material 2, or negative-electrode active material 3 which is included in each of the layers, the same materials are thermally solidified, and thus a dense structure in which the particle size is increased, the size of the void in each of the layers is decreased, and particle density is high is obtained. Thus, rigidity of each of the layers is improved. It is possible to prevent loss and the like of solid electrolyte 1, positive-electrode active material 2, or negative-electrode active material 3 which is included in each of the layers, and thus to secure long-term reliability of a battery. FIGS. 1, 3, and 4, and the like illustrate solid electrolyte 1, positive-electrode active material 2, and negative-electrode active material 3, by using circles. However, these illustrations are just schematic illustrations. Solid electrolyte 1, positive-electrode active material 2, and negative-electrode active material 3 may have any three-dimensional shape such as a particle shape, a fiber shape, and a scaly shape which may have an unevenness on the surface thereof.

In all-solid-state battery 100 according to the exemplary embodiment, in the heated regions of positive-electrode current collector 4 and positive electrode layer 20 which is adjacent to positive-electrode current collector 4, and in the heated regions of negative-electrode current collector 5 and negative electrode layer 30 which is adjacent to negative-electrode current collector 5, the metal material which is melt and is included in the current collector may be in a gap between particles in the adjacent layer. As illustrated in FIG. 1, in the end portions of positive-electrode current collector 4 and negative-electrode current collector 5, the metal materials which respectively constitute positive-electrode current collector 4 and negative-electrode current collector 5 are melted, in voids of positive electrode layer 20 and negative electrode layer 30 which are respectively adjacent to positive-electrode current collector 4 and negative-electrode current collector 5, and then are re-solidified (positive-electrode current collector 45 in voids of the positive electrode layer, and negative-electrode current collector 55 in voids of the negative electrode layer). Accordingly, it is possible to improve adhesiveness between the layers by the anchor effect, to prevent peeling-off between the layers or prevent loss of solid electrolyte 1, positive-electrode active material 2, or negative-electrode active material 3, and to secure long-term reliability of a battery.

Positive-electrode current collector 4 and negative-electrode current collector 5 in which the influence of heat is received are permeated into voids of positive electrode layer 20 or negative electrode layer 30, and are re-solidified. Thus, it is possible to improve adhesiveness between positive-electrode current collector 4 and positive electrode layer 20 and between negative-electrode current collector 5 and negative electrode layer 30, by the anchor effect. In addition, it is possible to prevent loss of positive-electrode active material 2 and negative-electrode active material 3 or prevent peeling-off between the current collector and the layer. Accordingly, it is possible to secure long-term reliability of a battery.

In all-solid-state battery 100 according to the exemplary embodiment, in at least one of positive electrode layer 20, solid electrolyte layer 10, and negative electrode layer 30, porosity of the heated region may be lower than porosity of a region other than the heated region. Correlation of the porosity and the size in the heat affected region of each of the layers will be described as follows. A region in which heat affected region 11 of solid electrolyte layer 10<a region of solid electrolyte layer 10 other than heat affected region 11 is satisfied is provided in solid electrolyte layer 10. A region in which heat affected region 21 of positive electrode layer 20<a region of positive electrode layer 20 other than heat affected region 21 is satisfied is provided in positive electrode layer 20. A region in which heat affected region 31 of negative electrode layer 30<a region of negative electrode layer 30 other than heat affected region 31 is satisfied is provided in negative electrode layer 30. Since particles in each of the layers are melted and aggregated (aggregated solid electrolyte 16) by the influence of heat, porosity in the heat affected region is decreased. Since the porosity of the end portion (heat affected region) at which peeling-off or loss occurs most easily is reduced, it is possible to prevent loss of the material constituting each of the layers from the end portion of each of the layers. In addition, it is possible to suppress peeling-off between the layers which are adjacent to each other, and to secure the long-term reliability of a battery.

In all-solid-state battery 100 according to the exemplary embodiment, each of positive electrode layer 20 and negative electrode layer 30 may further include solid electrolyte 1. Solid electrolyte 1 included in solid electrolyte layer 10 and solid electrolytes 1 included in positive electrode layer 20 and negative electrode layer 30 may be integrated with each other at an interface between the heated region of solid electrolyte layer 10 and the heated region of positive electrode layer 20 and an interface between the heated region of solid electrolyte layer 10 and the heated region of negative electrode layer 30. As illustrated in FIG. 1, in the heated region (heat affected region) at the end portion of each of the layers, solid electrolyte 15 is formed at an interface between positive electrode layer 20 and solid electrolyte layer 10, and solid electrolyte 17 is formed at an interface between negative electrode layer 30 and solid electrolyte layer 10. As described above, solid electrolytes 1 included in the layers are thermally aggregated, or are melted by heat and then re-solidified. Thus, it is possible to improve adhesiveness between the layers by the anchor effect, to prevent peeling-off between the layers or prevent loss of solid electrolyte 1, positive-electrode active material 2, or negative-electrode active material 3, and to secure long-term reliability of a battery.

Regarding the area of each of the layers constituting all-solid-state battery 100 illustrated in FIG. 1 in plan view (may be simply referred to as "an area" below) and the areas of positive-electrode current collector 4 and negative-electrode current collector 5, as a preferred exemplary embodiment, a form having a relationship of solid electrolyte layer 10>positive-electrode current collector 4 (=negative-electrode current collector 5)>negative electrode layer 30>positive electrode layer 20 is exemplified.

FIG. 2 illustrates a schematic top view of all-solid-state battery 100. As illustrated in FIG. 2, in a case where all-solid-state battery 100 is viewed in plan view, all-solid-state battery 100 in the exemplary embodiment is configured as follows. A circumferential portion (end portion) 34 of the negative electrode layer protrudes outwardly in comparison to a circumferential portion (may be referred to as "an end portion" below) 24 of the positive electrode layer.

A circumferential portion (end portion) 44 of the positive-electrode current collector and a circumferential portion (end portion) 54 of the negative-electrode current collector protrude outwardly in comparison to the circumferential portion (end portion) 24 of the positive electrode layer and the circumferential portion (end portion) 34 of the negative electrode layer. A circumferential portion (end portion) 14 of the solid electrolyte layer protrudes outwardly in comparison to the circumferential portion (end portion) 44 of the positive-electrode current collector and the circumferential portion (end portion) 54 of the negative-electrode current collector. In this manner, the size of the area of each of the layers and each of the members such as the current collectors, in plan view, is adjusted, and thus a form as illustrated in FIG. 2, in which the end portion of each of the members protrudes outwardly is obtained. Accordingly, it is possible to prevent an occurrence of short-circuit between the current collectors (positive-electrode current collector 4 and negative-electrode current collector 5), and an occurrence of short-circuit between positive electrode layer 20 and negative electrode layer 30.

A small quantity of binder 6 may be included in all-solid-state battery 100. Binder 6 performs at least any of the following operations: an operation of adhering positive-electrode active material 2 and positive-electrode current collector 4 to each other; an operation of adhering positive-electrode active material 2 and solid electrolyte 1 to each other; an operation of adhering positive-electrode active materials 2 (particles constituting positive-electrode active material 2) to each other; an operation of adhering negative-electrode active material 3 and negative-electrode current collector 5 to each other; an operation of adhering negative-electrode active material 3 and solid electrolyte 1 to each other; an operation of adhering negative-electrode active materials 3 (particles constituting negative-electrode active material 3) to each other; and an operation of adhering solid electrolytes 1 (particles constituting solid electrolyte 1) to each other. In all-solid-state battery 100 in the exemplary embodiment, solid electrolyte layer 10, positive electrode layer 20, and negative electrode layer 30 include binder 6 of a quantity which is smaller than that in the all-solid-state battery in the related art, as will be described later.

In the exemplary embodiment of the all-solid-state battery, the binder for performing at least any of the following operations is not included: an operation of adhering the positive-electrode active material and the positive-electrode current collector to each other; an operation of adhering the positive-electrode active material and the solid electrolyte to each other; an operation of adhering positive-electrode active materials to each other; an operation of adhering the negative-electrode active material and the negative-electrode current collector to each other; an operation of adhering the negative-electrode active material and the solid electrolyte to each other; an operation of adhering the negative-electrode active materials to each other; and an operation of adhering the solid electrolytes to each other. Alternatively, a small quantity of the binder is included. A sintered region in which particles are melted and then re-solidified is provided only at the end portion of any or a plurality of layers constituting a battery and at the end portion of a metal foil. It is possible to prevent loss of the material constituting each of the layers, from the end portion in each of the layers having the heated region at the end portion. In addition, it is possible to prevent peeling-off between the layers which are adjacent to each other. With this method, the binder can be unnecessary, or the quantity of the binder can be significantly reduced even in a region of each of the layers constituting an all-solid-state battery, other than the heated region. A situation in which battery capacity is decreased or internal resistance is increased due to the binder does not occur, and the battery characteristics are improved.

In the related art, binder 6 is added in order to improve adhesiveness between the solid electrolytes or between the layers. However, in the exemplary embodiment, rigidity and adhesiveness at the end portion at which peeling-off or loss occurs most easily is improved. Accordingly, it is possible to reduce the quantity of the binder to be added and to also expect improvement of battery capacity.

All-solid-state battery 100 in the exemplary embodiment is configured by an electrode group in which one solid electrolyte layer 10, one positive electrode layer 20 formed on the surface of positive-electrode current collector 4, and one negative electrode layer 30 formed on the surface of negative-electrode current collector 5 are stacked. However, it is not limited thereto. All-solid-state battery 100 in the exemplary embodiment can be configured by an electrode group in which positive electrode layers 20 are respectively formed on both surfaces of positive-electrode current collector 4, negative electrode layers 30 are respectively formed on both surfaces of negative-electrode current collector 5, and positive electrode layers 20 and negative electrode layers 30 are alternately stacked with solid electrolyte layer 10 interposed between positive electrode layer 20 and negative electrode layer 30. All-solid-state battery 100 in the exemplary embodiment is a stacked type, but it is not limited. All-solid-state battery 100 may be a wound type.

B. Solid Electrolyte Layer

Firstly, solid electrolyte layer 10 in the exemplary embodiment will be described. Solid electrolyte layer 10 in the exemplary embodiment includes, for example, solid electrolyte 1 and binder 6. High adhesion strength is realized in a manner that a functional group of improving adhesion strength provided by binder 6 reacts with solid electrolyte 1 and thus is bonded to solid electrolyte 1. Each material included in solid electrolyte layer 10 will be described below.

1. Solid Electrolyte

Solid electrolyte 1 in the exemplary embodiment will be described. Solid electrolyte 1 may be appropriately selected in accordance with the conducting ion type (for example, lithium ion). For example, solid electrolyte 1 can be roughly classified into a sulfide-based solid electrolyte and an oxide-based solid electrolyte. In the exemplary embodiment, the kind of the sulfide-based solid electrolyte is not particularly limited. $Li_2S$—$SiS_2$, $LiI$—$Li_2S$—$SiS_2$, $LiI$—$Li_2S$—$P_2S_5$, $LiI$—$Li_2S$—$P_2O_5$, $LiI$—$Li_3PO_4$—$P_2S_5$, $Li_2S$—$P_2S_5$, and $Li_3PS_4$ are exemplified. In particular, the sulfide-based solid electrolyte preferably includes Li, P, and S. The reason is that ion conductivity of Li is favorable. The reason is that $P_2S_5$ has high reactivity and high bonding properties to the binder. The sulfide-based solid electrolyte may be singly used or be used in combination of two kinds or more thereof.

The sulfide solid electrolyte may be crystalline or amorphous. The sulfide solid electrolyte may be glass ceramics.

The description of "$Li_2S$—$P_2S_5$" means a sulfide solid electrolyte using a raw material composition which includes $Li_2S$ and $P_2S_5$. Other descriptions are similarly applied.

In the exemplary embodiment, the material of the sulfide-based solid electrolyte is sulfide-based glass ceramic which includes $Li_2S$ and $P_2S_5$. The ratio of $Li_2S$ and $P_2S_5$ is preferably in a range of $Li_2S:P_2S_5$ which is equal to or greater than 70:30 and equal to or smaller than 80:20 in terms of mol, and more preferably in a range of equal to or greater than 75:25 and equal to or smaller than 80:20. This is made for obtaining a crystal structure having high ion conductivity while Li concentration which influences the battery characteristics is maintained. In addition, this is made for securing the amount of $P_2S_5$ enough for reacting with and being bonded to the binder.

The oxide-based solid electrolyte in the exemplary embodiment will be described. The type of oxide-based solid electrolyte is not particularly limited, and LiPON, $Li_3PO_4$, $Li_2SiO_2$, $Li_2SiO_4$, $Li_{0.5}La_{0.5}TiO_3$, $Li_{1.3}Al_{0.3}Ti_{0.7}(PO_4)_3$, $La_{0.51}Li_{0.34}TiO_{0.74}$, and $Li_{1.5}Al_{0.5}Ge_{1.5}(PO_4)_3$ are exemplified. The oxide-based solid electrolyte may be singly used or be used in combination of two kinds or more thereof.

2. Binder

Binder 6 in the exemplary embodiment will be described. For example, a functional group for improving adhesion strength, such as a carboxyl group, a carbonyl group, or a hydroxyl group is introduced in binder 6 in the exemplary embodiment. Binder 6 reacts with solid electrolyte 1 so as to bond solid electrolytes 1 to each other with binder 6 interposed between solid electrolytes 1. Binder 6 has a structure in which binder 6 is disposed between a certain solid electrolyte 1 and another solid electrolyte 1. As a result, the adhesion strength is improved.

Examples of binder 6 may include materials such as polyvinylidene fluoride (PVDF), polytetrafluoroethylene (PTFE), polyimide (PI), polyamide (PA), polyamide imide (PAI), butadiene rubber (BR), styrene butadiene rubber (SBR), nitrile-butadiene rubber (NBR), styrene-ethylene-butylene-styrene block copolymer (SEBS), and carboxymethyl cellulose (CMC); and combinations thereof. Binder 6 is not limited thereto. From a viewpoint of high-temperature durability, as the binder, polyimide, polyamide, polyamide imide, polyacryl, carboxymethyl cellulose, or the like may be used.

The added amount of binder 6 in the exemplary embodiment is preferably equal to or greater than 0.001% by mass and equal to or smaller than 5% by mass of the total amount of, for example, the solid electrolyte layer, more preferably equal to or greater than 0.01% by mass and equal to or smaller than 3% by mass, and further preferably in a range of equal to or greater than 0.01% by mass and equal to or smaller than 1% by mass. The reason is as follows. That is, if the added amount of binder 6 is smaller than the above range, bonding with binder 6 is not caused, and thus there is a probability of not being able to obtain sufficient adhesion strength. If the added amount of binder 6 is greater than the above range, binder 6 influences deterioration of the battery characteristics such as charging-and-discharging characteristics. Further, if the added amount of binder 6 is large, values of physical properties such as hardness, tensile strength, tensile elongation of binder 6 are changed, for example, in a low-temperature region. As a result, the charging-and-discharging characteristics are largely deteriorated.

C. Positive Electrode Layer

In all-solid-state battery 100 according to the exemplary embodiment, positive electrode layer 20 is formed on positive-electrode current collector 4 and includes at least positive-electrode active material 2. Positive electrode layer 20 may include, if necessary, solid electrolyte 1 as an ion conduction assistant, or may further include binder 6.

Positive electrode layer 20 in the exemplary embodiment will be described below with reference to FIG. 3. In FIG. 3, region 22 indicates a region of positive electrode layer 20 on an opposite side (solid electrolyte layer 10 side) of positive-electrode current collector 4, and region 23 indicates a region of positive electrode layer 20 on positive-electrode current collector 4 side. Positive electrode layer 20 in the exemplary embodiment includes solid electrolyte 1, positive-electrode active material 2, and binder 6 across region 22 (on a side of positive electrode layer 20 opposite to positive-electrode current collector 4) and region 23 (positive-electrode current collector 4 side). Heat affected region 21 is formed at the circumferential portion (end portion) 24 of positive electrode layer 20. In heat affected region 21, particle density is higher than that in a region of positive electrode layer 20 other than heat affected region 21, and the porosity is reduced. The functional group which is described in the section of "2. Binder" and has improved adhesion strength is introduced in positive electrode layer 20. Thus, with binder 6 interposed, positive-electrode active material 2 and solid electrolyte 1 are adhered to each other, positive-electrode active material 2 and positive-electrode current collector 4 are adhered to each other, solid electrolyte 1 and positive-electrode current collector 4 are adhered to each other, positive-electrode active materials 2 are adhered to each other, and solid electrolytes 1 are adhered to each other. The ratio between solid electrolyte 1 and positive-electrode active material 2 is preferably in a range of solid electrolyte: positive-electrode active material which is equal to or greater than 50:50 and equal to or smaller than 5:95 in terms of weight, and more preferably in a range of equal to or greater than 30:70 to equal to or smaller than 10:90. This is made for securing both Li conduction and electron conduction in positive electrode layer 20.

As will be described later, from a viewpoint of securing an electron conduction path in positive electrode layer 20, a conductive assistant may be added to positive electrode layer 20.

1. Positive-Electrode Active Material

Positive-electrode active material 2 in the exemplary embodiment will be described below.

Positive-electrode active material 2 refers to a material in which lithium is inserted into or separated from a crystal structure at a potential which is higher than that of negative electrode (negative electrode layer 30 and negative-electrode current collector 5), and thus oxidation or reduction is performed. The type of positive-electrode active material 2 is appropriately selected in accordance with the type of all-solid-state battery 100. For example, oxide active material and sulfide active material are exemplified.

As positive-electrode active material 2 in the exemplary embodiment, an oxide active material (lithium-containing transition metal oxide) is used. Examples of the oxide active material include rock salt layered active materials such as $LiCoO_2$, $LiMnO_2$, $LiNiO_2$, $LiVO_2$, and $LiNi_{1/3}Co_{1/3}Mn_{1/3}O_2$, spinel type active materials such as $LiMn_2O_4$ and $LiNi_{0.5}Mn_{1.5}O_4$, olivine type active materials such as $LiFePO_4$ and $LiMnPO_4$, and Si-containing active materials such as $Li_2FeSiO_4$ and $Li_2MnSiO_4$. In addition to the above materials, examples of the oxide active material include $Li_4Ti_5O_{12}$.

Examples of the shape of positive-electrode active material include a particulate shape and a thin-film shape. In a case where positive-electrode active material is particulate, the average particle size ($D_{50}$) thereof is, for example, in a range of equal to or greater than 1 nm and equal to or smaller than 100 nm, and preferably in a range of equal to or greater than 10 nm and equal to or smaller than 30 nm. The reason is as follows. If the average particle size of positive-electrode active material is too small, handling properties may be deteriorated. If the average particle size thereof is too large, it may be difficult to obtain a flat positive electrode layer. In this specification, "the average particle size" refers to an average size on the basis of the volume, which is measured by a laser diffraction and scattering type particle size distribution measuring device.

The content of positive-electrode active material 2 in positive electrode layer 20 is not particularly limited. For example, the content of positive-electrode active material 2 is preferably in a range of equal to or greater than 40% by mass and equal to or smaller than 99% by mass.

The surface of positive-electrode active material may be coated with a coat layer. The reason is that it is possible to suppress an occurrence of a reaction between positive-electrode active material (for example, oxide active material) 2 and solid electrolyte (for example, sulfide solid electrolyte) 1. Examples of the material of the coat layer may include Li ion conductive oxide such as $LiNbO_3$, $Li_3PO_4$, and LiPON. The average thickness of the coat layer is, for example, preferably in a range of equal to or greater than 1 nm and equal to or smaller than 20 nm, and more preferably in a range of equal to or greater than 1 nm and equal to or smaller than 10 nm.

2. Solid Electrolyte

Positive electrode layer 20 in the exemplary embodiment contains solid electrolyte 1 in addition to positive-electrode active material 2. Since the specific example of solid electrolyte 1 is the same as that described above in the section of "B. Solid Electrolyte Layer", descriptions thereof here will not be repeated. In the exemplary embodiment, solid electrolyte 1 which is the material of solid electrolyte layer 10 and solid electrolyte 1 contained in positive electrode layer 20 may be the same as each other or may be different from each other.

Solid electrolyte 1 in positive electrode layer 20, which is used in the exemplary embodiment may be a sulfide solid electrolyte, for example. The content of solid electrolyte 1 in positive electrode layer 20 is preferably in a range of equal to or greater than 1% by mass and equal to or smaller than 90% by mass, and more preferably in a range of equal to or greater than 10% by mass and equal to or smaller than 80% by mass.

3. Binder

Positive electrode layer 20 in the exemplary embodiment further contains binder 6, in addition to positive-electrode active material 2 and solid electrolyte 1 which are described above. Since the type of binder 6 is the same as that described above in the section of "B. Solid Electrolyte Layer", descriptions thereof here will not be repeated.

For example, the added amount of binder 6 is preferably equal to or greater than 0.001% by mass and equal to or smaller than 5% by mass of the total amount of the positive electrode layer, more preferably equal to or greater than 0.01% by mass and equal to or smaller than 3% by mass, and further preferably in a range of equal to or greater than 0.01% by mass and equal to or smaller than 1% by mass. That is, it is preferable that the volume ratio of the amount of binder 6 in solid electrolyte layer 10 is substantially equal to the volume ratio of the amount of binder 6 in positive electrode layer 20. The reason is as follows. That is, if the added amount of binder 6 is smaller than the above range, bonding with binder 6 is not caused, and thus there is a probability of not being able to obtain sufficient adhesion strength. If the added amount of binder 6 is greater than the above range, binder 6 influences deterioration of the battery characteristics such as charging-and-discharging characteristics. Further, if the added amount of binder 6 is large, values of physical properties such as hardness, tensile strength, tensile elongation of binder 6 are changed, for example, in a low-temperature region. As a result, the charging-and-discharging characteristics are largely deteriorated.

Regarding density of binder 6 in positive electrode layer 20, region 22 (region of positive electrode layer 20 on solid electrolyte layer 10 side, an opposite side of positive-electrode current collector 4) is higher than region 23 (region of positive electrode layer 20 on positive-electrode current collector 4 side). That is, in positive electrode layer 20, the density of binder 6 for improving adhesion strength, in region 23 (positive-electrode current collector 4 side) is lower than the density of binder 6 for improving adhesion strength, in region 22 (solid electrolyte layer 10 side, opposite side of positive-electrode current collector 4). Thus, it is possible to improve adhesion strength between positive electrode layer 20 and solid electrolyte layer 10, and to reduce the voids. As a result, Li conduction is actively performed, and charging-and-discharging characteristics are improved.

A place of positive electrode layer 20, in which many of positive-electrode active material 2 are provided is region 22 (solid electrolyte layer 10 side, an opposite side of positive-electrode current collector 4) instead of region 23 (region of positive electrode layer 20 on positive-electrode current collector 4 side). The reason is that a distance of region 22 (region of positive electrode layer 20 on solid electrolyte layer 10 side) from negative electrode layer 30 is close and resistance in Li conduction is small. Increasing the density of binder 6 in positive electrode layer 20 so as to be greater than that in region 23 (region on solid electrolyte layer 10 side instead of positive-electrode current collector 4 side, opposite side of positive-electrode current collector 4) means that many of binder 6 are provided in a place in which contraction largely occurs by emission of Li. As described above, since the density of binder 6 mixed in region 22 (region of positive electrode layer 20 on solid electrolyte layer 10 side) is increased, it is possible to improve adhesion strength between positive electrode layer 20 and solid electrolyte layer 10, and to suppress peeling-off between the layers occurring by expansion and contraction of the positive-electrode active material during charging or discharging. Accordingly, durability of the all-solid-state battery is improved and the charging-and-discharging characteristics are further improved.

4. Others

Positive electrode layer 20 in the exemplary embodiment may further include a conductive assistant. The conductive assistant is a material having high electron conductivity. For example, a carbon material, a metal material, or a combination thereof may be used. Examples of the carbon material may include vapor grown carbon fiber (VGCF), carbon black, acetylene black (AB), ketchen black (KB), carbon nanotube (CNT), and carbon nanofiber (CNF). Examples of the metal material may include metal such as titanium, stainless steel, aluminum, and precious metal such as platinum, silver, gold, and rhodium.

As described above, if positive electrode layer 20 contains the conductive assistant, it is possible to secure a conductive path and to decrease internal resistance. Thus, since the amount of a current which can flow through an electron conduction path is increased, the charging-and-discharging characteristics of all-solid-state battery are improved.

Considering balance of the electron conductivity between the battery capacity, and the positive electrode layer and the negative electrode layer (that is, the electrode layers), the content ratio of the conductive assistant is preferably equal to or greater than 1% by mass and equal to or smaller than 20% by mass, more preferably equal to or greater than 2% by mass and equal to or smaller than 15% by mass, and most preferably equal to or greater than 4% by mass and equal to or smaller than 10% by mass, with respect to the entirety of the electrode material (that is, positive electrode material or negative electrode material).

D. Negative Electrode Layer

In all-solid-state battery 100 according to the exemplary embodiment, negative electrode layer 30 is formed on negative-electrode current collector 5 and includes at least negative-electrode active material 3. Negative electrode layer 30 may include, if necessary, solid electrolyte 1 as an ion conduction assistant, or may further include binder 6.

FIG. 4 illustrates negative electrode layer 30 in the exemplary embodiment below. In FIG. 4, region 32 indicates a region of negative electrode layer 30 on an opposite side (solid electrolyte layer 10 side) of negative-electrode current collector 5, and region 33 indicates a region of negative electrode layer 30 on negative-electrode current collector 5 side. Negative electrode layer 30 in the exemplary embodiment includes solid electrolyte 1, negative-electrode active material 3, and binder 6 across region 32 (on an opposite side of negative-electrode current collector 5) and region 33 (negative-electrode current collector 5 side). Heat affected region 31 is formed at the end portion of negative electrode layer 30. In heat affected region 31, particle density is higher than that in a region of negative electrode layer 30 other than heat affected region 31, and the porosity is reduced. In negative electrode layer 30, with binder 6 to which a functional group for improving adhesion strength is interposed, negative-electrode active material 3 and solid electrolyte 1 are adhered to each other, negative-electrode active material 3 and negative-electrode current collector 5 are adhered to each other, solid electrolyte 1 and negative-electrode current collector 5 are adhered to each other, negative-electrode active materials 3 are adhered to each other, and solid electrolytes 1 are adhered to each other. The ratio between solid electrolyte 1 and negative-electrode active material 3 is preferably in a range of solid electrolyte: negative-electrode active material which is equal to or greater than 5:95 and equal to or smaller than 60:40 in terms of weight, and more preferably in a range of equal to or greater than 30:70 to equal to or smaller than 50:50. This is made for securing both Li conduction and electron conduction in negative electrode layer 30.

As will be described later, from a viewpoint of securing an electron conduction path in negative electrode layer 30, a conductive assistant may be added to negative electrode layer 30.

1. Negative-Electrode Active Material

Negative-electrode active material 3 in the exemplary embodiment will be described. Negative-electrode active material 3 refers to a material in which lithium is inserted into or separated from a crystal structure at a potential which is lower than that of the positive electrode (positive electrode layer 20 and positive-electrode current collector 4), and thus oxidation or reduction is performed. As negative-electrode active material 3 in the exemplary embodiment, a metal active material, a carbon active material, and an oxide active material are exemplified. Examples of the metal active material include easy alloyed metal with lithium, such as Li (lithium), In (indium), Sn (tin), Si (silicon), and Al (aluminum). Examples of the carbon active material include mesocarbon microbeads (MCMB), highly oriented graphite (HOPG), hard carbon, graphite (artificial, natural), and soft carbon. Examples of the oxide active material include $Nb_2O_5$, $Li_4Ti_5O_{12}$, and $SiO_x$. A complex and the like obtained by appropriately mixing the above-described negative-electrode active materials may be also used.

2. Solid Electrolyte

Negative electrode layer 30 in the exemplary embodiment contains solid electrolyte 1 in addition to negative-electrode active material 3. Since descriptions of solid electrolyte 1 are the same as those described above in the section of "C. Positive Electrode Layer", the descriptions thereof here will not be repeated.

3. Binder

Negative electrode layer 30 in the exemplary embodiment further contains binder 6, in addition to negative-electrode active material 3 and solid electrolyte 1 which are described above. Since the specific example of binder 6 is the same as that described above in the section of "B. Solid Electrolyte Layer", descriptions thereof here will not be repeated.

The density of the binder in negative electrode layer 30 is not particularly limited. In an exemplary embodiment of negative electrode layer 30, the density of the binder in region 32 (region of negative electrode layer 30 on solid electrolyte layer 10, opposite side of negative-electrode current collector 5) is higher than that in region 33 (region of negative electrode layer 30 on negative-electrode current collector 5 side). That is, in negative electrode layer 30, the density of binder 6 for improving adhesion strength, in region 33 (negative-electrode current collector 5 side) is lower than the density of binder 6 for improving adhesion strength, in region 32 (solid electrolyte layer 10 side, opposite side of negative-electrode current collector 5). Thus, when negative electrode layer 30 and solid electrolyte layer 10 are disposed as all-solid-state battery 100, it is possible to improve adhesion strength between negative electrode layer 30 and solid electrolyte layer 10, and to reduce the voids functioning as obstacles of Li conduction. As a result, Li conduction is actively performed, and charging-and-discharging characteristics are improved.

4. Others

Negative electrode layer 30 in the exemplary embodiment may further a conductive assistant. Since descriptions of conductive assistant are the same as those described above in the section of "C. Positive Electrode Layer", the descriptions thereof here will not be repeated.

E. Other Components

All-solid-state battery 100 according to the exemplary embodiment includes positive-electrode current collector 4 and negative-electrode current collector 5 in addition to the above-described components. Positive-electrode current collector 4 performs current collection of the positive-electrode active material. For example, metal materials such as SUS, aluminum, nickel, titanium, copper, and alloys of two kinds or more thereof, carbon materials, conductive resin materials, or the like are used for positive-electrode current collector 4. Examples of the shape of positive-electrode current collector 4 may include a foil-like body, a plate-like body, and a mesh-like body.

Negative-electrode current collector 5 performs current collection of the negative-electrode active material. For example, metal materials such as SUS, copper, nickel, and alloys of two kinds or more thereof, carbon materials, conductive resin materials, or the like are used for negative-electrode current collector 5. Examples of the shape of negative-electrode current collector 5 may include a foil-like body, a plate-like body, and a mesh-like body.

The thickness, the shape, and the like of positive-electrode current collector 4 and negative-electrode current collector 5 may be appropriately selected in accordance with the use of the all-solid-state battery.

Although not illustrated, in all-solid-state battery 100 according to the exemplary embodiment, for example, a metal positive electrode lead is welded on a surface of positive-electrode current collector 4 on an opposite side of positive electrode layer 20, and a metal negative electrode lead is welded on a surface of negative-electrode current collector 5 on an opposite side of negative electrode layer 30. All-solid-state battery 100 obtained in this manner or a battery group obtained by connecting a plurality of all-solid-state batteries with each other may be stored in a battery case. The positive electrode lead and the negative electrode lead may be drawn to the outside of the battery case, and the battery case may be sealed. Here, as the battery case, for example, a case which has any shape and is formed of a metal material, a resin material, or the like, a bag formed by an aluminum laminate film or the like, and the like can be used.

F. Manufacturing Method of all-Solid-State Battery

A manufacturing method of the all-solid-state battery according to the exemplary embodiment will be described below with reference to FIGS. 5A to 8. The manufacturing method of all-solid-state battery 100 according to the exemplary embodiment is a manufacturing method of an all-solid-state battery which includes a current collector in which metal is used as a material, and an electrode layer and a solid electrolyte layer which are stacked on the current collector. The manufacturing method includes a process of stacking a positive-electrode active material layer, a solid electrolyte layer, and a negative-electrode active material layer on the current collector, and a process of cutting out a stacked body (electrode group for the all-solid-state battery) formed in the stacking process, by using optical energy.

That is, according to the exemplary embodiment, the manufacturing method of the all-solid-state battery is a manufacturing method of an all-solid-state battery which includes a positive-electrode current collector, a positive electrode layer which is formed on the positive-electrode current collector and includes at least a positive-electrode active material, a negative-electrode current collector, a negative electrode layer which is formed on the negative-electrode current collector and includes at least a negative-electrode active material, and a solid electrolyte layer which is disposed between the positive electrode layer and the negative electrode layer, and includes at least a solid electrolyte having ion conductivity. At least one member selected from the group consisting of the positive-electrode current collector, the positive electrode layer, the solid electrolyte layer, the negative-electrode current collector, and the negative electrode layer includes a heated region at an end portion thereof. In the heated region, influence of heat is received or particles included in the member are melted and then are re-solidified. The manufacturing method includes a preparation process and a laser cutting process. In the preparation process, at least one member selected from the group consisting of the positive-electrode current collector, the positive electrode layer, the solid electrolyte layer, the negative-electrode current collector, and the negative electrode layer which constitute an electrode group for the all-solid-state battery is prepared before laser cutting. In the laser cutting process, the at least one member is cut out by using laser such that the at least one member is formed so as to have a predetermined outer shape, and thus a heated region in which an influence of heat is received is formed at an end portion of the at least one member after being cut out. Further, a sintered region in which particles are melted and then re-solidified is formed in the heat affected region.

Further, one form of the manufacturing method of the all-solid-state battery may include a film formation process and a pressing process. In the film formation process, a positive electrode layer formed on the positive-electrode current collector, a negative electrode layer formed on the negative-electrode current collector, and a solid electrolyte layer are prepared. In the pressing process, the positive electrode layer formed on the positive-electrode current collector, the negative electrode layer formed on the negative-electrode current collector, and the solid electrolyte layer are stacked such that the solid electrolyte layer is disposed between the positive electrode layer and the negative electrode layer, and the obtained stacked body (electrode group for an all-solid-state battery) is pressed.

As described above, it is possible to also form a sintered region by performing laser cutting after at least one member constituting the electrode group for an all-solid-state battery is formed to have a predetermined outer shape. Thus, it is possible to also form a heat affected region after stacking, for a layer having an end portion which is positioned on an inner side, as with positive electrode layer 20 and negative electrode layer 30. In the heat affected region, a sintered region is formed in a predetermined region from a cut section, by heat generated by laser cutting. It is possible to stabilize rigidity and adhesiveness of the end portion by the sintered region formed in such a manner. Since the sintered region is formed by the laser cutting process, it is possible to simplify the manufacturing process and to improve productivity.

As another exemplary embodiment of the manufacturing method of all-solid-state battery 100, for example, the manufacturing method includes, for example, a film formation process (not illustrated) such as a coating process, a pressing process (not illustrated), and a laser cutting process. In the film formation process, solid electrolyte layer 10, positive electrode layer 20, and negative electrode layer 30 are formed. In the pressing process, the filling factor of each of the layers is adjusted to be a predetermined filling factor and compacting is performed. In the laser cutting process, cutting is performed so as to have predetermined size and shape. More specifically, the manufacturing method in the exemplary embodiment includes a film formation process, a press forming process, and a laser cutting process. In the film formation process, solid electrolyte layer 10, positive electrode layer 20 formed on the surface of positive-electrode current collector 4, and negative electrode layer 30 formed on the surface of negative-electrode current collector 5 are prepared. In the press forming process, the above-described layers are stacked such that solid electrolyte layer 10 is disposed between positive electrode layer 20 and negative electrode layer 30, and obtained stacked body (electrode group for an all-solid-state battery) 101 is pressed. In the laser cutting process, the stacked body (electrode group for an all-solid-state battery) 101 after pressing is cut out so as to have a predetermined shape and predetermined dimensions.

In the film formation process, film formation is performed in accordance with the well-known method. For example, a slurry is prepared in a manner that the materials of the layers are dissolved and dispersed in a solvent (for example, N-methyl-2-pyrrolidone). In a case where solid electrolyte layer 10 is produced, the obtained slurry is applied onto a flat base material, and the base material is exfoliated during a period when the solvent is removed by heating the solvent. Thus, solid electrolyte layer 10 is obtained. In a case where positive electrode layer 20 is produced, a slurry for a positive electrode layer may be applied onto positive-electrode current collector 4. Then, the solvent may be removed from the obtained coated film by heating, and thereby positive electrode layer 20 may be formed. Negative electrode layer 30 may be produced in a manner similar to the above descriptions, except that a slurry for a negative electrode is applied onto negative-electrode current collector 5.

In the pressing process, positive electrode layer 20 which is formed on positive-electrode current collector 4 and includes positive-electrode active material 2, negative electrode layer 30 which is formed on negative-electrode current collector 5 and includes negative-electrode active material 3, and solid electrolyte layer 10 which is disposed between positive electrode layer 20 and negative electrode layer 30 and includes solid electrolyte 1 having ion conductivity are formed, and then pressing, for example, at 4 ton/cm$^2$ is performed from the outsides of positive-electrode current collector 4 and negative-electrode current collector 5, thereby an electrode group 101 for an all-solid-state battery is obtained. The reason is as follows. If the filling factor of at least one of the layers in obtained electrode group 101 for an all-solid-state battery is set to be equal to or greater than 60% and smaller than 100%, and each of the layers is set to have a filling factor of equal to or greater than 60%, voids in solid electrolyte layer 10 or in positive electrode layer 20 or negative electrode layer 30 are reduced. Thus, Li conduction and electron conduction are actively performed, and favorable charging-and-discharging characteristics are obtained. The filling factor means a proportion of the volume of the material occupying except for the voids, to the total volume. The pressing pressure is not limited to 4 ton/cm$^2$. Pressing pressure which allows the filling factor of each of the layers to be adjusted in a desired range may be appropriately selected.

Figure 5B:
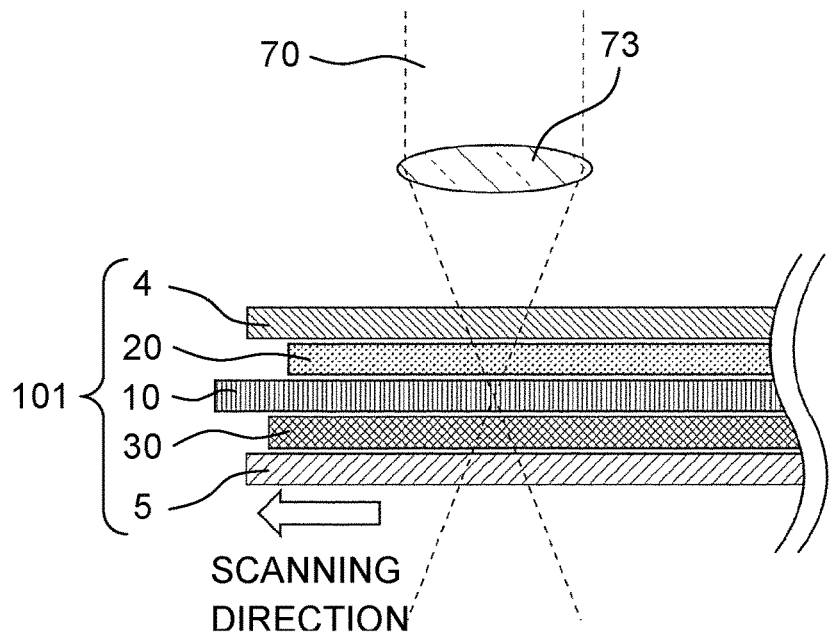
FIG. 5B is a schematic diagram illustrating the cutting method using laser for the electrode group for the all-solid-state battery in the exemplary embodiment, when viewed from a direction indicated by an arrow b illustrated in FIG. 5A.
Figure 5C:
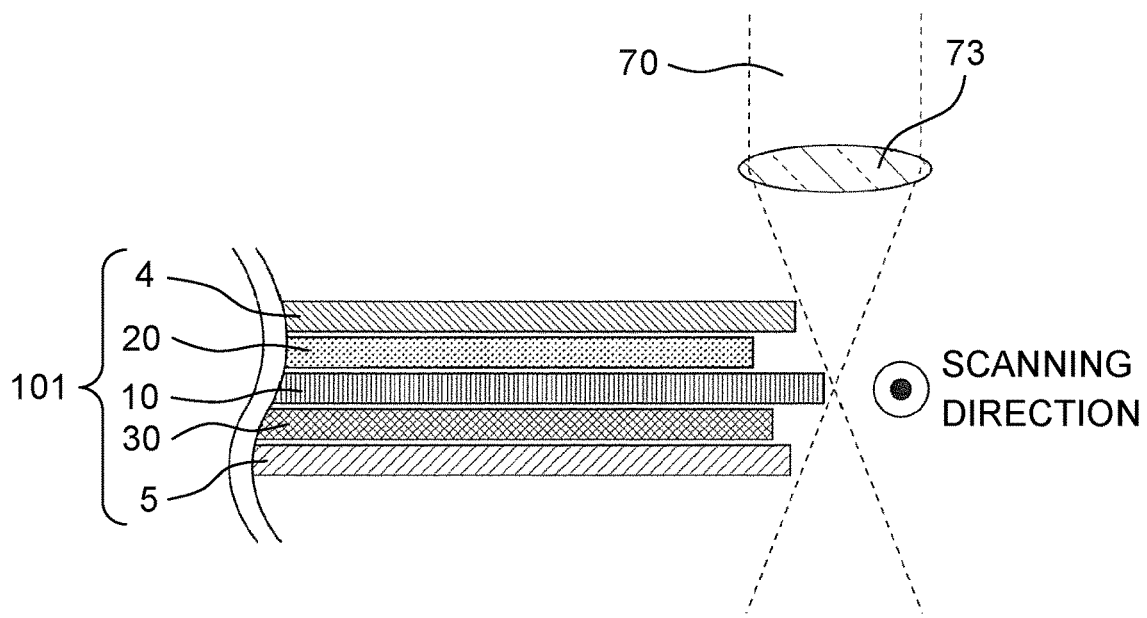
FIG. 5C is a schematic diagram illustrating the cutting method using laser for the electrode group for the all-solid-state battery in the exemplary embodiment, when viewed from a direction indicated by an arrow c illustrated in FIG. 5A.

In the laser cutting process, the pressed electrode group 101 for an all-solid-state battery, which has been obtained in the pressing process is cut out so as to have a desired shape in plan view and desired dimensions, and thus it is possible to obtain all-solid-state battery 100 having desired shape and size. Here, FIG. 5A is a schematic top view illustrating a cutting method using laser for electrode group 101 for the all-solid-state battery in the exemplary embodiment. FIG. 5B is a schematic diagram illustrating the cutting method using laser for electrode group 101 for the all-solid-state battery in the exemplary embodiment, when viewed from a direction indicated by an arrow b illustrated in FIG. 5A. FIG. 5C is a schematic diagram illustrating the cutting method using laser for electrode group 101 for the all-solid-state battery in the exemplary embodiment, when viewed from a direction indicated by an arrow c illustrated in FIG. 5A. In this process, irradiation with laser light 70 condensed by condensing optical element 73 is performed from one current collector side (positive-electrode current collector 4 side or negative-electrode current collector 5 side). Scanning is performed on a contour which is planned to be cut out, and thus electrode group 101 for an all-solid-state battery is cut out so as to have predetermined size and shape. Condensing optical element 73 is disposed over the end portion of electrode group 101 for an all-solid-state battery. A portion of energy of laser light 70 with which the current collector or the electrode layer is irradiated is absorbed and thus converted into heat. Thus, it is possible to cut out electrode group 101 for an all-solid-state battery by fusing or sublimation. Since cutting is performed by using energy of laser light 70, the cutting width can be formed so as to have a difference by a difference of an absorption rate of laser light 70 between the layers. As in the schematic diagram illustrated in FIG. 5C and illustrating electrode group 101 for an all-solid-state battery when viewed from the direction indicated by the arrow c, the position of the section of each of the layers can be controlled.

For example, in a case where a laser absorption rate of the material constituting the current collector or the electrode layer is large, it is possible to secure energy enough for fusing or sublimation. Thus, the cutting width becomes wide and removal to the position on the inner side can be performed. Conversely, in a case of a material having a low laser absorption rate, energy used for fusing or sublimation is small, the cutting width becomes narrow and a shape in which an end portion protrudes is obtained.

Since an influence of heat transferability, a melting point, a sublimation point, or the like of the material forming the current collector or the electrode layer is received, the laser wavelength may be selected so as to obtain a combination in which the laser absorption rate is suitable.

In the laser cutting process, in a region adjacent to a region in which fusion or sublimation is performed, a temperature does not reach a temperature at which fusion or sublimation is performed, and a heat affected region is formed by melting and re-solidifying. At this time, after stacking, the heat affected region is also formed in the layer having an end portion which is positioned on an inner side, as with positive electrode layer 20 and negative electrode layer 30. In the heat affected region, a sintered region is formed in a predetermined region from a cut section, by heat generated by laser cutting. Rigidity and adhesiveness of the end portion by the sintered region formed in such a manner are stabilized. Since the sintered region is formed by the laser cutting process, it is possible to simplify the manufacturing process and to improve productivity.

The battery characteristics are decreased in a case where the heat affected region is wide. Thus, a region within 5 mm from the cut end portion is desired, and a heat affected region in which it is possible to secure suitable rigidity and adhesiveness by the material of each of the layers may be formed.

The heat affected region may be also changed in accordance with the user of an all-solid-state battery. As with an all-solid-state battery used for in-vehicle, in a case where an external force such as vibration is applied more, a fault phenomenon such as peeling-off between the layers and loss of an electrode material is easily caused. Thus, it is desirable that the rigidity and the adhesiveness are improved more by setting the heat affected region to be large. As with an all-solid-state battery used in a fixed site, in a case where the external force is small, it is desirable that the heat affected region is set to be small and thus the battery characteristics are improved more.

As a method of using an all-solid-state battery, in a case where charging and discharging are performed for a short time, in a case where the temperature of the all-solid-state battery is largely changed, or in a case of following a rapid change of the temperature, a fault phenomenon such as peeling-off between the layers and loss of an electrode material is easily caused by an influence of expansion and contraction of each of the layers. Thus, it is desirable that the rigidity and the adhesiveness are improved by setting the heat affected region to be large.

The heat affected region may also be changed in accordance with an installation state of the all-solid-state battery. The heat affected region may be set to be large only at an end portion in a direction in which troubles such as loss of an electrode material easily occurs by an external force such as gravity, and thus the rigidity and the adhesiveness may be partially improved.

Scanning with laser light 70 may be performed such that all layers may be cut together or cutting of the layers one by one may be performed plural number of times. In a case where cutting of the layers one by one is performed plural number of times, adjustment to a condition (laser output, a spot diameter, a scanning speed, a laser polarization direction, or the like) of laser light 70, which is suitable for the layer to be cut can be performed, and the heat affected region adequate for each of the layers is easily formed. In the exemplary embodiment, irradiation with laser light 70 is performed from an upper part (simply referred to as "upper part" below) of electrode group 101 for an all-solid-state battery, in plan view. However, it is not limited thereto, and the irradiation may be performed from a lower part of electrode group 101 for an all-solid-state battery.

In the manufacturing method of an all-solid-state battery according to the exemplary embodiment, at least one member constituting the electrode group for an all-solid-state battery may be cut out by using a plurality of laser focusing points. Thus, in comparison to a case where one laser focusing point is used, it is possible to control the shape of a cut section of the member which has been cut out, and the sintered region formed at the cut end portion, with higher accuracy.

Figure 6A:
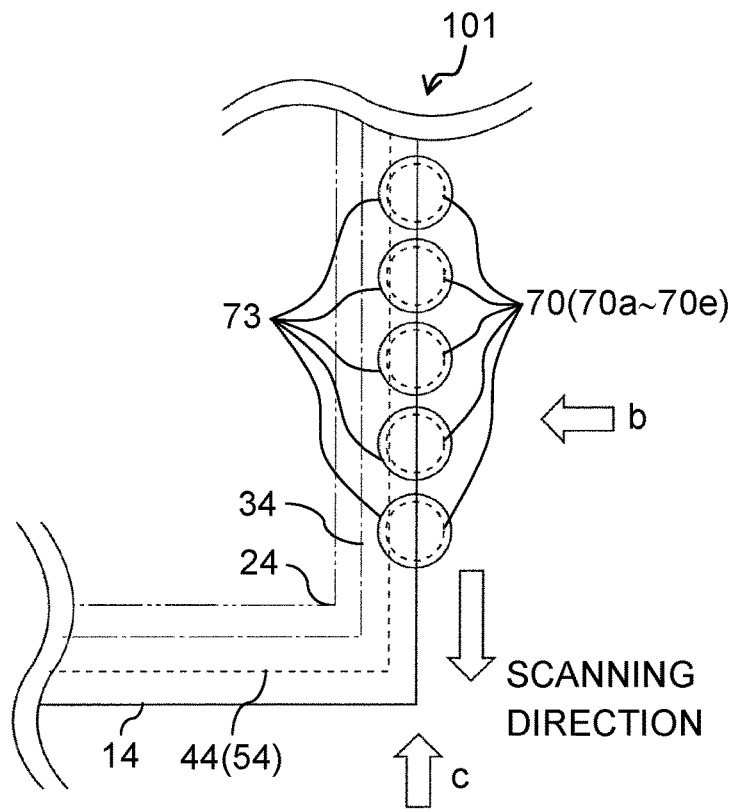
FIG. 6A is a schematic top view illustrating a cutting method using branched laser light for the electrode group for the all-solid-state battery in the exemplary embodiment.
Figure 6B:
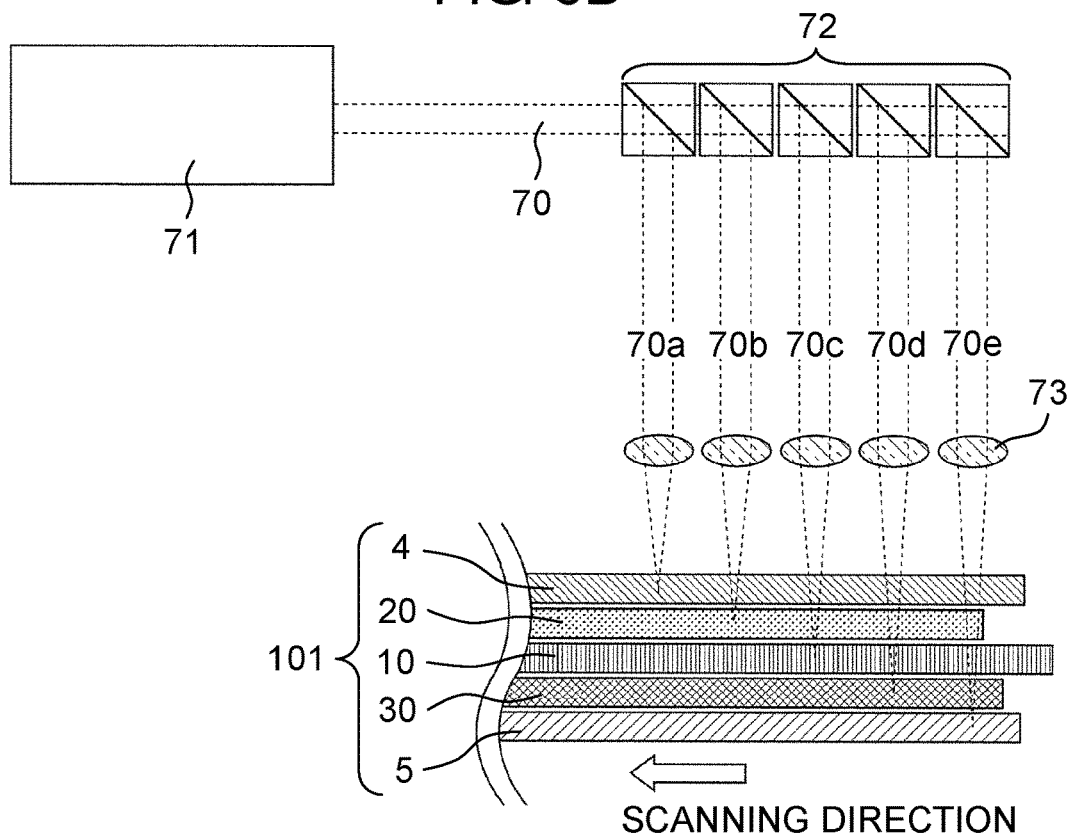
FIG. 6B is a schematic diagram illustrating the cutting method using branched laser light for the electrode group for the all-solid-state battery in the exemplary embodiment, when viewed from a direction indicated by an arrow b illustrated in FIG. 6A.
Figure 6C:
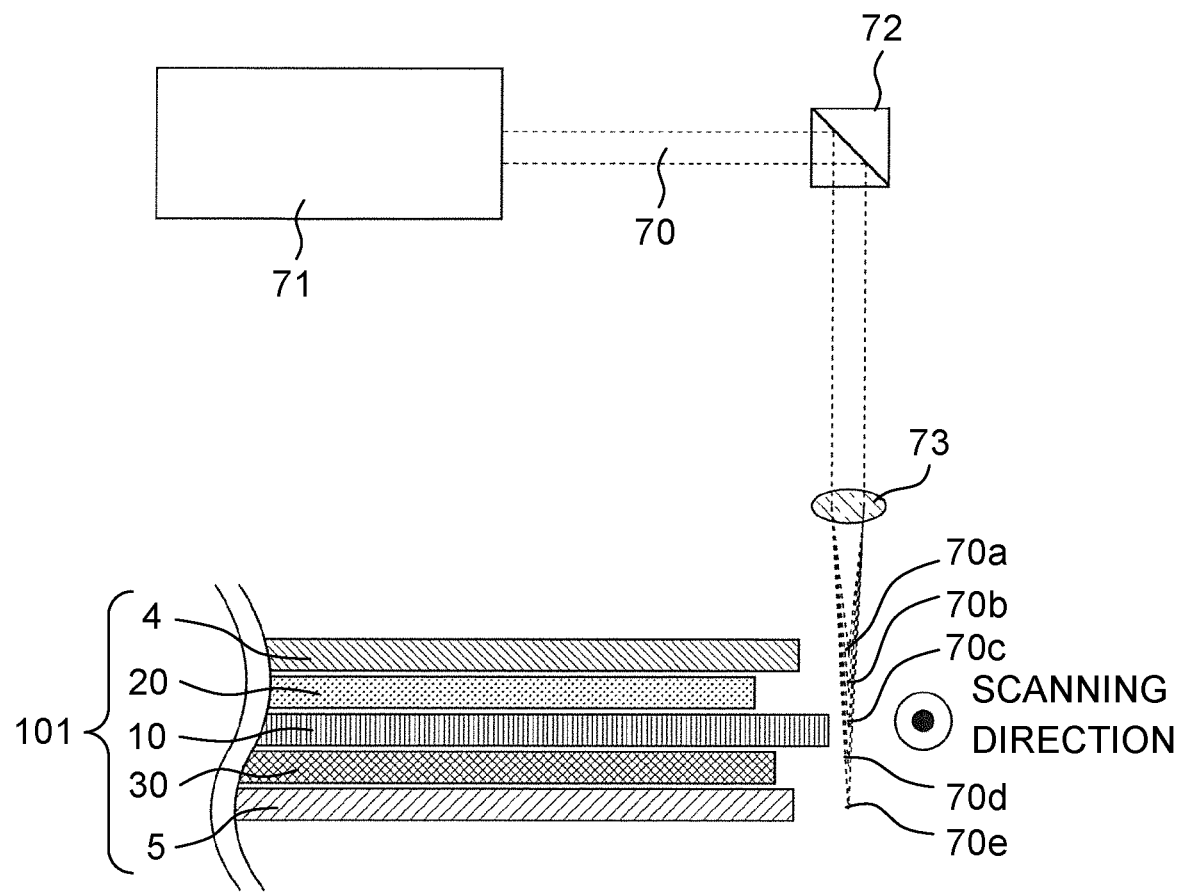
FIG. 6C is a schematic diagram illustrating the cutting method using branched laser light for the electrode group for the all-solid-state battery in the exemplary embodiment, when viewed from a direction indicated by an arrow c illustrated in FIG. 6A.

Here, FIG. 6A is a schematic top view illustrating a cutting method using branched laser light for the electrode group for the all-solid-state battery in the exemplary embodiment. FIG. 6B is a schematic diagram illustrating the cutting method using branched laser light for the electrode group for the all-solid-state battery in the exemplary embodiment, when viewed from a direction indicated by an arrow b illustrated in FIG. 6A. FIG. 6C is a schematic diagram illustrating the cutting method using branched laser light for the electrode group for the all-solid-state battery in the exemplary embodiment, when viewed from a direction indicated by an arrow c illustrated in FIG. 6A. As illustrated in FIG. 6B, laser oscillator 71 and plurality of branching optical elements 72 are disposed over the end portion of the electrode group for an all-solid-state battery. Laser light 70 emitted from laser oscillator 71 is branched into a plurality of beams by using branching optical element 72 such as a beam splitter. Then, the branched beams of the laser light are condensed at predetermined positions by using condensing optical elements 73 such as condenser lenses, and irradiation is performed.

FIGS. 6A to 6C illustrate a method in which one ray of laser light 70 is branched into 5 rays 70a to 70e of laser light by the branching optical elements 72, and cutting and working are performed by respectively condensing 5 rays 70a to 70e of laser light on the members of positive-electrode current collector 4, positive electrode layer 20, solid electrolyte layer 10, negative electrode layer 30, and negative-electrode current collector 5 of electrode group 101 for an all-solid-state battery. Here, electrode group 101 for an all-solid-state battery may be cut out in a state where laser light 70 is branched into 5 rays, considering the absorption rate, the thickness, and the like of each of the members. For example, electrode group 101 for an all-solid-state battery may be cut out by using laser light 70 which has been branched into three rays of laser light 70a for cutting out positive-electrode current collector 4, laser light 70b for cutting out the three layers of positive electrode layer 20, solid electrolyte layer 10, and negative electrode layer 30 together, and laser light 70c for cutting out negative-electrode current collector 5.

One member constituting electrode group 101 for an all-solid-state battery may be cut out by using laser light which has been branched into a plurality of rays. For example, one member may be cut out by laser light which is branched into rays of which the number is greater than 5. The reason is that it is possible to control the shape of the cut section of one layer and the sintered region formed at the cut end portion with higher accuracy.

Regarding cutting of electrode group 102 for a layer built battery, in which plurality of electrode groups 101 for an all-solid-state battery are stacked in a stacking direction of the members, similar to the cutting method of electrode group 101 for an all-solid-state battery, one member or one electrode group 101 for an all-solid-state battery may be cut out by laser light which has been branched into a plurality of rays. A plurality of members or a plurality of electrode groups 101 for an all-solid-state battery, which are stacked may be cut out at the same time by one ray of laser light.

In the exemplary embodiment, irradiation with laser light 70 is performed from the upper part of electrode group 101 for an all-solid-state battery. However, it is not limited thereto. The irradiation may be performed from a lower part of electrode group 101 for an all-solid-state battery (and electrode group 102 for a layer built battery). Electrode group 101 for an all-solid-state battery (and electrode group 102 for a layer built battery) which is held to be perpendicular to a horizontal plane may be irradiated with laser light 70 from a horizontal direction.

As a branching method of laser, in addition to branching optical element 72 such as a beam splitter, a branching method using a diffraction phenomenon of light with an optical diffraction element or the like may be provided. This branching method is suitable in a case where a beam spot is disposed at a certain three-dimensional position.

As a condensing method of the laser light, in addition to the condensing optical element such as a lens, a condensing method using the Fresnel effect with an optical diffraction element or the like may be provided. Thus, an optical diffraction element which has a function of branching laser light and a function of condensing the laser light can be obtained. Accordingly, it is possible to reduce the number of optical elements and to adjust an optical axis with high precision.

Electrode group 101 for an all-solid-state battery is pressed and a terminal (lead) is attached to all-solid-state battery 100 obtained by cutting with laser. Then, the resultant is stored in a case. As the case of all-solid-state battery 100, for example, an aluminum laminate bag, a case made of SUS, iron, or aluminum, a resin case, or the like is used.

In the manufacturing method of the all-solid-state battery according to the exemplary embodiment, when a plurality of members are cut, each of the plurality of members may be separately cut by using laser. Then, the plurality of members may be stuck to each other, thereby an all-solid-state battery may be produced. Thus, it is possible to produce an allsolid-state battery with more precise dimensional accuracy. It is possible to adjust the size of the heat affected region to be a size which is suitable for each of the layers.

Figure 7A:
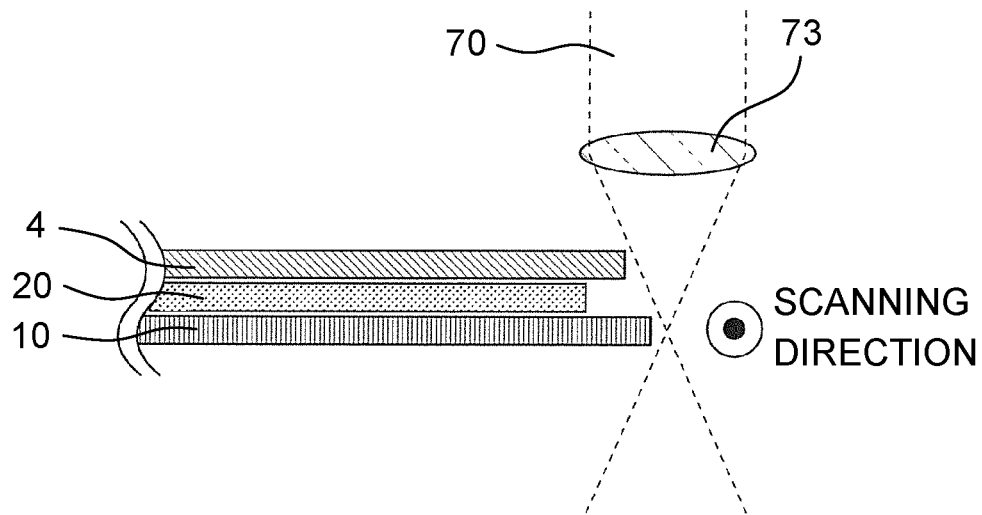
FIG. 7A is a schematic diagram illustrating a positive electrode side (including a solid electrolyte layer) in a case where the electrode group for the all-solid-state battery in the exemplary embodiment is divided into two of the positive electrode side and a negative electrode side, when the positive electrode side is viewed from a downstream side of a scanning direction of laser in the cutting method using the laser.
Figure 7B:
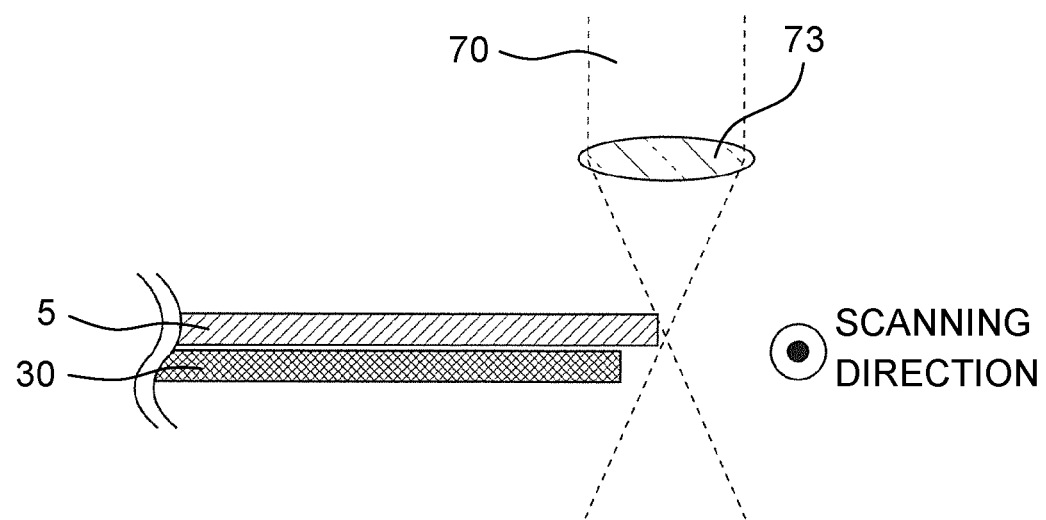
FIG. 7B is a schematic diagram illustrating a negative electrode side (not including the solid electrolyte layer) in a case where the electrode group for the all-solid-state battery in the exemplary embodiment is divided into two of a positive electrode side and the negative electrode side, when the negative electrode side is viewed from the downstream side of the scanning direction of laser in the cutting method using the laser.

As another cutting method using laser, FIGS. 7A and 7B illustrate schematic diagrams of a process in which electrode group 101 for an all-solid-state battery in the exemplary embodiment is divided into two of a positive electrode side and a negative electrode side, and each of the two is separately cut out by using laser. Here, the positive electrode side is a region in which solid electrolyte layer 10, positive electrode layer 20, and positive-electrode current collector 4 are provided. The negative electrode side is a region in which negative electrode layer 30 and negative-electrode current collector 5 are provided. FIG. 7A is a schematic diagram illustrating scanning of laser on a stacked body of solid electrolyte layer 10, positive electrode layer 20, and positive-electrode current collector 4 when viewed from a downstream side of a scanning direction of the laser. FIG. 7B is a schematic diagram illustrating scanning of laser on a stacked body of negative electrode layer 30 and negative-electrode current collector 5 when viewed from the downstream side of the scanning direction of the laser. The stacked body passes through the film formation process (coating process, not illustrated) and the pressing process (not illustrated), and then is cut out by using laser.

In FIG. 7A, solid electrolyte layer 10 is formed on positive electrode layer 20 side, but solid electrolyte layer 10 may be formed on negative electrode layer 30.

In FIGS. 7A and 7B, irradiation with laser light 70 is performed from the current collector (positive-electrode current collector 4 and negative-electrode current collector 5) side. However, irradiation with laser light 70 may be performed from any side of solid electrolyte layer 10, positive electrode layer 20, and negative electrode layer 30.

Figure 7C:
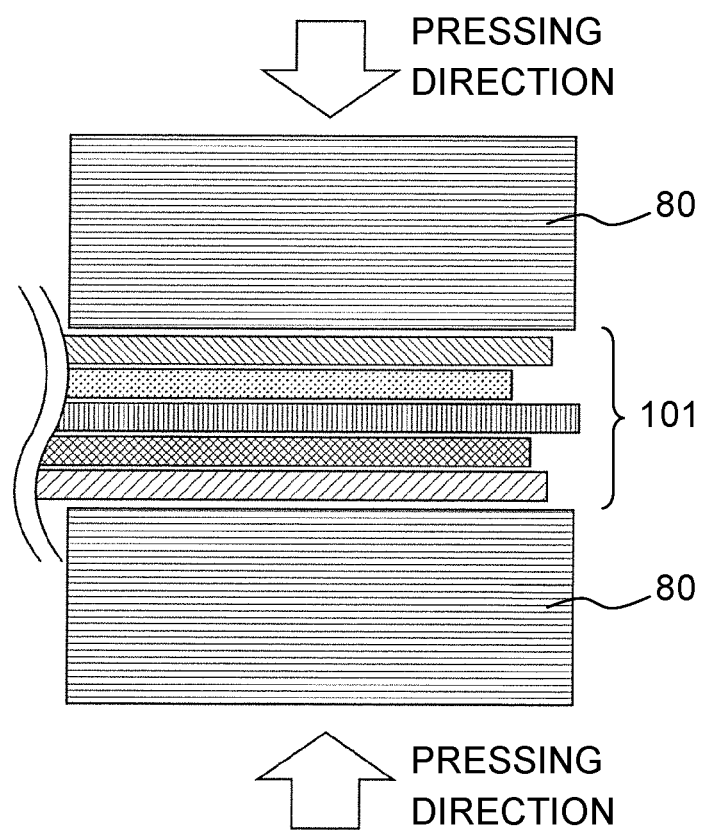
FIG. 7C is a schematic diagram illustrating a bonding process after cutting using laser, in a case where the electrode group for the all-solid-state battery in the exemplary embodiment is divided into the two of the positive electrode side and the negative electrode side.

FIG. 7C illustrates a sticking process after cutting is performed by using laser, in a case where the electrode group for an all-solid-state battery in the exemplary embodiment is divided into two of the positive electrode side and the negative electrode side. Positive-electrode current collector 4 and negative-electrode current collector 5 are overlapped such that each of positive-electrode current collector 4 and negative-electrode current collector 5 is positioned on the outer side of the electrode group for an all-solid-state battery. Then, sticking is performed by using a sticking apparatus 80 such as a pressing apparatus. Pressing may be performed in a manner similar to the above-described pressing process.

Since laser cutting is separately performed on the positive electrode side and the negative electrode side, working with more precise dimensional accuracy is possible and it is easy to adjust the size of the heat affected region to be a size suitable for each of the layers.

In the manufacturing method of the all-solid-state battery according to the exemplary embodiment, a plurality of electrode groups for an all-solid-state battery may be stacked and the obtained stacked body (electrode group for a layer built battery) of the plurality of electrode groups for an all-solid-state battery may be cut out by using laser. Even if position shift occurs in the plurality of electrode groups for an all-solid-state battery, which have been stacked, the stacked body (electrode group for a layer built battery) is cut out by using laser. Thus, regardless of the degree of position shift of each of the members and each of the electrode groups, it is possible to produce a layer built battery having high dimensional accuracy.

Figure 8:
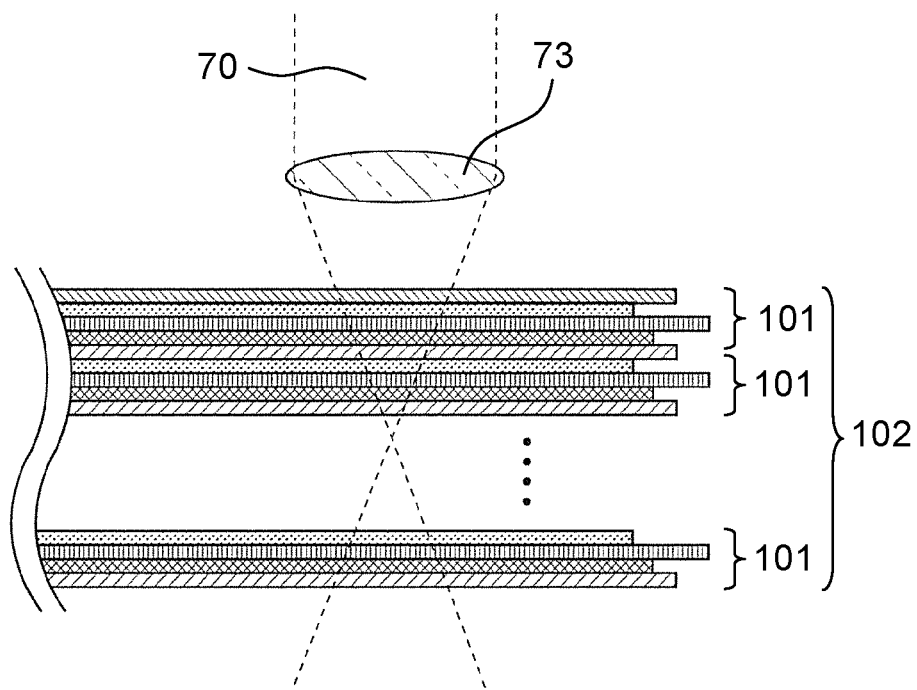
FIG. 8 is a schematic diagram illustrating a cutting method using laser for a stacked body (electrode group for a layer built battery) of a plurality of electrode groups for an all-solid-state battery in the exemplary embodiment.

FIG. 8 is a schematic diagram illustrating a process in a case where plurality of electrode groups 101 for an all-solid-state battery are stacked and the plurality of electrode groups 101 for an all-solid-state battery are cut out together by using laser. Here, plurality of electrode groups 101 for an all-solid-state battery are stacked, for example, with insulation members such as a resin film interposed between the electrode groups.

In the stacked body (electrode group 102 for a layer built battery) of plurality of electrode groups 101 for an all-solid-state battery, laser cutting of all layers is performed with scanning once, and thus cut sections from the top surface of the stacked body to the bottom surface are flush regardless of position shift during stacking. Thus, it is possible to produce a stacked body (layer built battery 103) having high dimensional accuracy. Since the numerical aperture (NA) of laser light 70 with which electrode group 101 for an all-solid-state battery is irradiated is reduced, the depth of a focus of laser light 70 becomes deep. Thus, it is possible to cut plurality of electrode groups 101 for an all-solid-state battery (electrode group 102 for a layer built battery), which are stacked to be thicker.

As a method of reducing the numerical aperture (NA) of laser light 70, in a case where condensing optical element 73 is a lens and the like, a general method, for example, a method of increasing a beam diameter of laser light 70 which is incident to the lens, or a method of lengthening the focal length of the lens may be used.

When the stacked body of plurality of electrode groups 101 for an all-solid-state battery (electrode group 102 for a layer built battery) is cut, scanning with laser light 70 may be performed plural number of times. When irradiation with laser is performed each time, the focal position is shift in a thickness direction of the stacked body. Thus, working can be performed in a region of a constant laser spot diameter, and it is possible to produce a layer built battery 103 (not illustrated) having higher dimensional accuracy.

In the exemplary embodiment, the manufacturing method of an all-solid-state battery, which includes the film formation process, the pressing process, and the laser cutting process is described. However, it is not limited thereto. All-solid-state battery 100 may be produced in a manner that each of solid electrolyte layer 10, positive electrode layer 20 formed on positive-electrode current collector 4, and negative electrode layer 30 formed on negative-electrode current collector 5 is separately subjected to laser cutting so as to have predetermined shape and dimensions similar to the above descriptions, and then the members after the laser cutting are stuck to each other. In this case, an effect in that loss of a constituent material from the end portion of each of the members is prevented is also sufficiently exhibited.

EXAMPLES

Example 1

A Cu foil having a thickness of 75 μm was prepared as a positive-electrode current collector. 1.4 g of $LiNi_{0.8}Co_{0.15}Al_{0.05}O_2$ (average particle size: 5 μm) as a positive-electrode active material and 0.6 g of $CaCO_3$ in a glass ceramics state were prepared. These substances were pulverized by a mortar and were mixed. The obtained powder was referred to as a positive-electrode material mixture. The obtained positive-electrode material mixture and 0.001 g of maleic anhydride modified hydrogenated SEBS (M1913 manufactured by Asahi Kasei Corporation) were prepared. These substances were dissolved or dispersed in 2 g of a solvent, thereby a slurry of the positive-electrode material mixture was produced. At this time, the content of the maleic anhydride modified hydrogenated SEBS was 0.05% by mass with respect to the positive-electrode material mixture. Then, the obtained slurry was applied onto the positive-electrode current collector. Then, a dry treatment is performed at 100° C. for 10 minutes, so as to remove the solvent. Accordingly, a coated film of the positive-electrode material mixture, as a positive electrode layer was produced. The film thickness of the coated film of the positive-electrode material mixture was about 70 μm.

A stacked body (referred to as "a positive electrode" below) of the coated film of the positive-electrode material mixture and the positive-electrode current collector which had been obtained was irradiated with laser light, and thus sintering was performed simultaneously with cutting. As the laser light, single mode fiber laser (3 kW single mode YLS-3000-SM manufactured by IPG Corporation) was used. Laser light emitted from fiber is made to be parallel light by a collimating lens (f: 355 mm). The parallel light was condensed at a fθ lens (255 mm), and a spot of about 20 μm in optical calculation was formed. Scanning with the laser light made to be parallel light by the collimating lens was performed by a galvano mirror, and thus a positive electrode was cut out so as to have a predetermined shape.

As the laser, a continuous wave was used. Laser power was 2000 W and a scanning speed was 5 m/sec. Irradiation of the positive electrode with laser was performed from the Cu foil (positive-electrode current collector) side.

A sintered region was formed in the coated film of the positive-electrode material mixture, in a region in a range of equal to or greater than 50 μm and equal to or smaller than 100 μm from the cut end portion. In the sintered region, particles forming the coated film of the positive-electrode material mixture were coarsened or particles of forming the positive-electrode material mixture was baked. Thus, it could be confirmed that porosity of the coated film (positive electrode layer) of the positive-electrode material mixture was reduced and particle density was increased. In addition, it could be confirmed that the Cu foil (positive-electrode current collector) was melted and was permeated into voids (gaps) in the coated film (positive electrode layer) of the positive-electrode material mixture.

Example 2

A Cu foil having a thickness of 100 μm was prepared as a negative-electrode current collector. 0.8 g of graphite as a negative-electrode active material and 1.2 g of $CaCO_3$ in a glass ceramics state were prepared. These substances were pulverized by a mortar and were mixed. The obtained powder was referred to as a negative-electrode material mixture. The obtained negative-electrode material mixture and 0.001 g of maleic anhydride modified hydrogenated SEBS (M1913 manufactured by Asahi Kasei Corporation) were prepared. These substances were dissolved or dispersed in 2 g of a solvent, thereby a slurry of the negative-electrode material mixture was produced. At this time, the content of the maleic anhydride modified hydrogenated SEBS was 0.1% by mass with respect to the negative-electrode material mixture. Then, the obtained slurry was applied onto the negative-electrode current collector. Then, a dry treatment is performed at 100° C. for 10 minutes, so as to remove the solvent. Accordingly, a coated film of the negative-electrode material mixture, as a negative electrode layer was produced. The film thickness of the coated film of the negative-electrode material mixture was about 150 μm.

A stacked body (referred to as "a negative electrode" below) of the coated film of the negative-electrode material mixture and the negative-electrode current collector which had been obtained was irradiated with laser light, and thus sintering was performed simultaneously with cutting. As the laser light, single mode fiber laser (3 kW single mode YLS-3000-SM manufactured by IPG Corporation) was used. Laser light emitted from fiber is made to be parallel light by a collimating lens (f: 355 mm). The parallel light was condensed at a fθ lens (255 mm), and a spot of about 20 μm in optical calculation was formed. Scanning with the laser light made to be parallel light by the collimating lens was performed by a galvano mirror, and thus a negative electrode was cut out so as to have a predetermined shape.

As the laser, a continuous wave was used. Laser power was 2000 W and a scanning speed was 5 m/sec. Irradiation of the negative electrode with laser was performed from the Cu foil (negative-electrode current collector) side.

A sintered region was formed in the coated film of the negative-electrode material mixture, in a region in a range of equal to or greater than 50 μm and equal to or smaller than 100 μm from the cut end portion. In the sintered region, particles forming the coated film of the negative-electrode material mixture were coarsened or particles of forming the negative-electrode material mixture was baked. Thus, it could be confirmed that porosity of the coated film (negative electrode layer) of the negative-electrode material mixture was reduced and particle density was increased. In addition, it could be confirmed that the Cu foil (negative-electrode current collector) was melted and was permeated into voids (gaps) in the coated film (negative electrode layer) of the negative-electrode material mixture.

Hitherto, the all-solid-state battery and the manufacturing method of the all-solid-state battery according to the disclosure are described based on the exemplary embodiment and the examples. However, the disclosure is not limited to the exemplary embodiment and the examples. In a range without departing from the main gist of the disclosure, various modifications obtained by the person skilled in the related art are applied to the exemplary embodiment and the examples, and another form constructed by combining some constituent components in the exemplary embodiment and the examples is also included in the range of the disclosure.

According to the disclosure, it is expected that the all-solid-state battery and the manufacturing method of the all-solid-state battery according to the disclosure are applied to a power supply of portable electronic equipment or the like, or an in-vehicle battery.

What is claimed is:
1. An all-solid-state battery comprising:
   a positive-electrode current collector;
   a positive electrode layer which is formed on the positive-electrode current collector and includes at least a positive-electrode active material;
   a negative-electrode current collector;
   a negative electrode layer which is formed on the negative-electrode current collector and includes at least a negative-electrode active material; and
   a solid electrolyte layer which is disposed between the positive electrode layer and the negative electrode layer and includes at least a solid electrolyte having ion conductivity, wherein:
   at least one member selected from the group consisting of the positive-electrode current collector, the positive electrode layer, the solid electrolyte layer, the negative-electrode current collector, and the negative electrode layer includes a heated region in which an influence of heat is received and particles included in the at least one member are melted and then re-solidified, at an end portion equal to or greater than 50 μm and equal to or smaller than 100 μm from an end of the at least one member, the positive electrode layer further includes a solid electrolyte, the negative electrode layer further includes a solid electrolyte, the solid electrolyte included in the solid electrolyte layer is integrated with the solid electrolyte included in the positive electrode layer at an interface between a heated region of the solid electrolyte layer and a heated region of the positive electrode layer, and the solid electrolyte included in the solid electrolyte layer is integrated with the solid electrolyte included in the negative electrode layer at an interface between the heated region of the solid electrolyte layer and a heated region of the negative electrode layer.

2. The all-solid-state battery of claim 1, wherein, in the at least one member, a particle included in the heated region is larger than a particle included in a region other than the heated region.

3. The all-solid-state battery of claim 1, wherein, in the at least one member, porosity in the heated region is lower than porosity in a region other than the heated region.

4. The all-solid-state battery of claim 1, wherein, in a heated region of the positive-electrode current collector, a heated region of the positive electrode layer adjacent to the positive-electrode current collector, a heated region of the negative-electrode current collector, and a heated region of the negative electrode layer adjacent to the negative-electrode current collector, a metal material which is melted and is included in the positive-electrode current collector is in void between particles of the positive electrode layer adjacent to the positive-electrode current collector, and a metal material which is melted and is included in the negative-electrode current collector is in void between particles of the negative electrode layer adjacent to the negative-electrode current collector.

5. A manufacturing method of an all-solid-state battery according to claim 1 which includes a positive-electrode current collector, a positive electrode layer which is formed on the positive-electrode current collector and includes at least a positive-electrode active material, a negative-electrode current collector, a negative electrode layer which is formed on the negative-electrode current collector and includes at least a negative-electrode active material, and a solid electrolyte layer which is disposed between the positive electrode layer and the negative electrode layer, and includes at least a solid electrolyte having ion conductivity, the method comprising:

a preparation process of preparing at least one member selected from the group consisting of the positive-electrode current collector, the positive electrode layer, the solid electrolyte layer, the negative-electrode current collector, and the negative electrode layer which constitute an electrode group for the all-solid-state battery, before laser cutting; and a laser cutting process of cutting out the at least one member by using laser so as to form the at least one member to have a predetermined outer shape to form a heated region in which an influence of heat is received or particles included in the at least one member is melted and then re-solidified, at an end portion of the at least one member after being cut out.

6. The manufacturing method of an all-solid-state battery of claim 5, wherein, in the laser cutting process, the at least one member constituting the electrode group for the all-solid-state battery is cut out by using a plurality of laser focusing points.

7. The manufacturing method of an all-solid-state battery of claim 5, wherein, in the laser cutting process, when a plurality of members are cut out, the all-solid-state battery is produced in a manner that each of the plurality of members is separately cut out by using laser, and then the plurality of members which have been cut out are bonded to each other.

8. The manufacturing method of an all-solid-state battery of claim 5, wherein, in the laser cutting process, a plurality of electrode groups for an all-solid-state battery are stacked, and a stacked body obtained by stacking the plurality of electrode groups for an all-solid-state battery is cut out by using laser.

* * * * *